(12) United States Patent
Logue

(10) Patent No.: US 9,760,501 B2
(45) Date of Patent: Sep. 12, 2017

(54) IN-FIELD SMART DEVICE UPDATES

(71) Applicant: Google Inc., Mountain View, CA (US)

(72) Inventor: Jay D. Logue, San Jose, CA (US)

(73) Assignee: Google Inc., Mountain View, CA (US)

( * ) Notice: Subject to any disclaimer, the term of this patent is extended or adjusted under 35 U.S.C. 154(b) by 18 days.

(21) Appl. No.: 14/533,885

(22) Filed: Nov. 5, 2014

(65) Prior Publication Data

US 2016/0124868 A1    May 5, 2016

(51) Int. Cl.
    *H04L 29/06*    (2006.01)
    *G06F 12/14*    (2006.01)
    *H04L 9/14*     (2006.01)
    *H04L 12/28*    (2006.01)
    *G06F 21/33*    (2013.01)

(52) U.S. Cl.
    CPC ............ *G06F 12/1408* (2013.01); *H04L 9/14* (2013.01); *H04L 12/2816* (2013.01); *H04L 63/0428* (2013.01); *H04L 63/0823* (2013.01); *G06F 21/33* (2013.01); *G06F 2212/1052* (2013.01); *H04L 2209/24* (2013.01)

(58) Field of Classification Search
    None
    See application file for complete search history.

(56) References Cited

U.S. PATENT DOCUMENTS

| | | | |
|---|---|---|---|
| 6,775,285 B1 * | 8/2004 | Moles | H04L 29/06 370/392 |
| 7,549,048 B2 | 6/2009 | Freeman et al. | |
| 7,657,255 B2 | 2/2010 | Abel et al. | |
| 7,817,988 B2 | 10/2010 | Kruis et al. | |
| 8,365,018 B2 | 1/2013 | Mcintosh et al. | |
| 8,385,916 B2 | 2/2013 | Raleigh | |
| 8,498,572 B1 | 7/2013 | Schooley et al. | |
| 8,547,873 B2 | 10/2013 | Yee | |
| 8,621,567 B2 | 12/2013 | Kleinsteiber et al. | |
| 9,130,910 B1 | 9/2015 | Logue | |
| 9,241,270 B1 | 1/2016 | Logue | |
| 2003/0174760 A1 | 9/2003 | Rick et al. | |
| 2004/0001594 A1 * | 1/2004 | Krishnaswamy | H04L 63/0428 380/277 |
| 2004/0082323 A1 * | 4/2004 | Smith | H04L 12/5895 455/418 |
| 2004/0204005 A1 | 10/2004 | Ishidoshiro | |
| 2004/0221045 A1 | 11/2004 | Joosten et al. | |

(Continued)

OTHER PUBLICATIONS

Seung-Hyun Seo, An access control mechanism for remote control of home security system, 2012.

(Continued)

*Primary Examiner* — Malcolm Cribbs
(74) *Attorney, Agent, or Firm* — Colby Nipper

(57) ABSTRACT

Methods and systems for causing a device to join a network or fabric. A joining device sends an indication that the electronic device is not connected to a network type and receives a device ID for an assisting device to assist the electronic device in joining a network of the network type. Moreover, the assisting device resides on the network. The joining device then authenticates to the assisting device from the assisting device and receives network credentials for the network. Furthermore, the joining device joins the network using the network credentials.

14 Claims, 15 Drawing Sheets

(56) References Cited

U.S. PATENT DOCUMENTS

| | | | |
|---|---|---|---|
| 2005/0005098 A1* | 1/2005 | Michaelis | G06F 21/51 |
| | | | 713/156 |
| 2005/0130647 A1* | 6/2005 | Matsuda | G06F 3/1203 |
| | | | 455/426.2 |
| 2006/0155814 A1* | 7/2006 | Bennett | H04L 29/06027 |
| | | | 709/207 |
| 2007/0030857 A1 | 2/2007 | Fulknier et al. | |
| 2007/0121529 A1 | 5/2007 | Meier | |
| 2007/0173325 A1 | 7/2007 | Shaw et al. | |
| 2008/0259902 A1 | 10/2008 | Park | |
| 2009/0089865 A1 | 4/2009 | Baron et al. | |
| 2009/0124259 A1 | 5/2009 | Attar et al. | |
| 2009/0128517 A1 | 5/2009 | Han et al. | |
| 2010/0165879 A1 | 7/2010 | Gupta et al. | |
| 2010/0238830 A1 | 9/2010 | Kim et al. | |
| 2011/0128845 A1 | 6/2011 | Wu | |
| 2011/0305338 A1 | 12/2011 | Rogan | |
| 2012/0115455 A1 | 5/2012 | Rao | |
| 2012/0204243 A1 | 8/2012 | Wynn et al. | |
| 2013/0064151 A1 | 3/2013 | Mujtaba et al. | |
| 2013/0086639 A1 | 4/2013 | Sondhi et al. | |
| 2013/0241697 A1 | 9/2013 | Baumert | |
| 2013/0346743 A1* | 12/2013 | Dixon | H04L 9/3247 |
| | | | 713/156 |
| 2014/0004827 A1 | 1/2014 | O'Leary | |
| 2014/0056172 A1 | 2/2014 | Lee et al. | |
| 2014/0094182 A1 | 4/2014 | Sato | |
| 2014/0115655 A1 | 4/2014 | Marvais et al. | |
| 2014/0167929 A1 | 6/2014 | Shim et al. | |
| 2014/0181521 A1 | 6/2014 | Hemphill et al. | |
| 2014/0273941 A1 | 9/2014 | Ramprasad | |
| 2014/0282923 A1 | 9/2014 | Narayan et al. | |
| 2014/0289831 A1* | 9/2014 | Prakash | H04L 9/3228 |
| | | | 726/7 |
| 2015/0067641 A1* | 3/2015 | Nyisztor | H04L 41/082 |
| | | | 717/121 |
| 2015/0103034 A1 | 4/2015 | Shepelev et al. | |
| 2015/0134967 A1 | 5/2015 | Moore | |
| 2016/0072806 A1 | 3/2016 | Kim et al. | |
| 2016/0094601 A1* | 3/2016 | Besehanic | H04L 67/32 |
| | | | 709/219 |
| 2016/0128104 A1 | 5/2016 | Logue | |
| 2016/0295399 A1 | 10/2016 | Li et al. | |

OTHER PUBLICATIONS

"Final Office Action", U.S. Appl. No. 14/534,116, Nov. 21, 2016, 29 pages.

"Non-Final Office Action", U.S. Appl. No. 14/534,116, Jun. 24, 2016, 27 pages.

"Non-Final Office Action", U.S. Appl. No. 14/572,560, Apr. 16, 2015, 23 pages.

"Notice of Allowance", U.S. Appl. No. 14/572,546, Apr. 29, 2015, 13 pages.

"Notice of Allowance", U.S. Appl. No. 14/572,560, Sep. 9, 2015, 8 pages.

"Pre-interview First Office Action", U.S. Appl. No. 14/572,546, Feb. 6, 2015, 4 pages.

"Non-Final Office Action", U.S. Appl. No. 14/534,116, dated Mar. 17, 2017, 27 pages.

* cited by examiner

IN-FIELD SMART DEVICE UPDATES

BACKGROUND OF THE DISCLOSURE

This disclosure relates to systems, devices, methods, and related computer program products for smart buildings including the smart home. More particularly, this patent specification relates to updating smart devices in a smart home environment.

Some homes today are equipped with smart home networks to provide automated control of devices, appliances and systems, such as heating, ventilation, and air conditioning ("HVAC") systems, lighting systems, alarm systems, and home theater and entertainment systems. Smart home fabrics may include one or more networks of devices interconnected to automation functions within the home. For example, a person may input a desired temperature and a schedule indicating when the person is away from home.

In some scenarios, one or more devices may not connect to all networks within a fabric or the fabric itself due to these devices lacking information used to connect to the networks and/or the fabric itself. However, in some scenarios, it may be undesirable to have the user manually cause these devices to update because of inconvenience to the user. Furthermore, in some scenarios, it may also not be desirable to update these devices with secure information from a service since the service would store all such information thereby placing security information for numerous networks and/or fabrics in a single location (e.g., the service). It may be desirable to update the secure information to the devices without providing such information to the service.

BRIEF SUMMARY OF THE DISCLOSURE

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure provide methods and systems for enabling devices to join devices to network and/or fabrics consisting of several networks and adding the devices to the network and/or fabrics. In some embodiments, these devices may already be deployed in the field but may be missing some information or features that are used to join the networks and/or fabrics. Thus, in some embodiments, the data is sent over to the devices from a service before the devices join the networks and/or fabrics. However, some of the network/fabric credentials, such as keys and network names, may not be known to the service. In such embodiments, devices on the network/fabric may send over the credentials to the joining device as assisting devices.

BRIEF DESCRIPTION OF THE DRAWINGS

Various aspects of this disclosure may be better understood upon reading the following detailed description and upon reference to the drawings in which.

DETAILED DESCRIPTION OF THE DISCLOSURE

Figure 1:
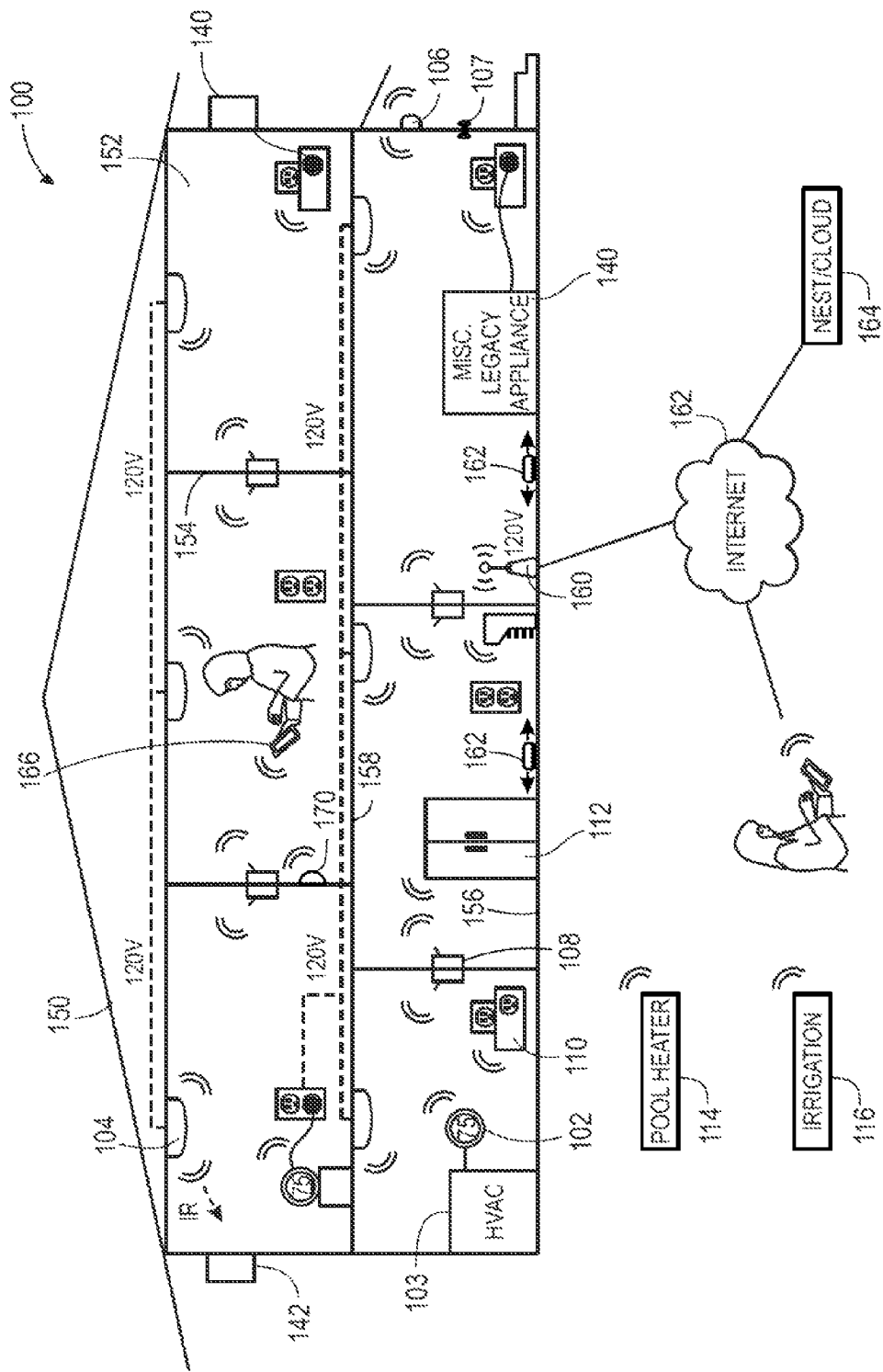
FIG. 1 illustrates an embodiment of a smart-home environment within which one or more of the devices, methods, systems, services, and/or computer program products described herein may be used, according to an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including." and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate generally to adding devices to network and/or fabrics consisting of several networks. In some embodiments, these devices may already be deployed in the field but may be missing some information or features that are used to join the networks and/or fabrics. Thus, in some embodiments, the data is sent over to the devices from a service before the devices join the networks and/or fabrics. However, some of the network/fabric credentials, such as keys and network names, may not be known to the service. In such embodiments, devices on the network/fabric may send over the credentials to the joining device as assisting devices.

It should be appreciated that "smart home environments" may refer to smart environments or smart networks for any building type, such as single-family houses, duplexes, townhomes, multi-unit apartment buildings, hotels, retail stores, office buildings, industrial buildings, and any building that may include one or more smart devices.

It is to be further appreciated that while the terms user, customer, installer, homeowner, occupant, guest, tenant, landlord, repair person, user, and similar terms may be used to refer to a person or persons interacting with a smart device within the network via a user interface, these references are by no means to be considered as limiting the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the units, and is also one of the users of the units. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. While the identity of the person performing the action may be germane to a particular advantage provided by one or more of the embodiments—for example, the password-protected network commissioning functionality described herein may be particularly advantageous where the landlord holds the sole password and can control network additions—such identity should not be construed in the descriptions that follow as necessarily limiting the scope of the present teachings to those particular individuals having those particular identities.

Smart Network

With the foregoing in mind, FIG. 1 illustrates an example of a smart-home environment 100, also referred to as a smart network, within which one or more of the devices, methods, systems, services, and/or computer program products described further herein can be applicable. The depicted smart-home environment 100 includes a structure 150, which can include, e.g., a house, office building, garage, or mobile home. In some embodiments, the devices can also be integrated into a smart-home environment 100 that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes multiple rooms 152, separated at least partly from each other via walls 154. The walls 154 can include interior walls or exterior walls. Each room can further include a floor 156 and a ceiling 158. Devices can be mounted on, integrated with and/or supported by a wall 154, floor 156 or ceiling 158.

In some embodiments, the smart-home environment 100 of FIG. 1 includes various devices, including intelligent, multi-sensing, network-connected devices that may integrate seamlessly with each other, with a central server, with a cloud-computing system, or some combination of these to provide any of a variety of useful smart-home objectives. The smart-home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected doorbell devices 106 (hereinafter referred to as "smart doorbells 106"), and one or more intelligent, network-connected door locks 107 (hereinafter referred to as "smart door locks 107"). According to embodiments, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, or carbon monoxide). The smart doorbell 106 may detect a person's approach to or departure from a location (e.g., an outer door), control doorbell functionality, announce a person's approach or departure via audio or visual means, or control settings on a security system (e.g., to activate or deactivate the security system when occupants go and come). The smart door locks 107 may detect and toggle between a locked and unlocked condition for doors in the home, detect a person's approach to or departure from a respective door, detect whether a door is open or closed, or other suitable controls associated with a smart door lock.

In some embodiments, the smart-home environment 100 of FIG. 1 further includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

Further, in some embodiments, the smart-home environment 100 of FIG. 1 includes multiple intelligent, multi-sensing, network-connected appliances 112 (hereinafter referred to as "smart appliances 112"), such as refrigerators, stoves and/or ovens, televisions, washers, dryers, lights, stereos, intercom systems, garage-door openers, floor fans, ceiling fans, wall air conditioners, pool heaters, irrigation systems, security systems, window sensors, security systems, and so forth. According to embodiments, the network-connected appliances 112 may be made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 140, such as old conventional washer/dryers, refrigerators, and the like which can be controlled, albeit coarsely (ON/OFF), by virtue of the smart wall plugs 110. The smart-home environment 100 can further include a variety of partially communicating legacy appliances 142, such as infrared ("IR") controlled wall air conditioners or other IR-controlled devices, which can be controlled by IR signals provided by the smart hazard detectors 104 or the smart wall switches 108.

According to embodiments, the smart thermostats 102, the smart hazard detectors 104, the smart doorbells 106, the smart door lock 107, the smart wall switches 108, the smart wall plugs 110, and other devices of the smart-home environment 100 may be modular and may be incorporated into older and new houses. For example, in some embodiments, the devices are designed around a modular platform consisting of two basic components: a head unit and a back plate, also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

Many different commercial and functional possibilities for provisioning, maintenance, and upgrade are possible. For example, after years of using any particular head unit, a user may be able to buy a new version of the head unit and simply plug it into the old docking station. There are also many different versions for the head units, such as low-cost versions with few features, and then a progression of increasingly-capable versions, up to and including sophisticated head units with a large number of features. Thus, it should be appreciated that the various versions of the head units may be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room," "kitchen," and so forth.

The smart-home environment 100 may also include communication with devices outside of the physical home but within a proximate geographical range of the home. For example, the smart-home environment 100 may include a pool heater monitor 114 that communicates a current pool temperature to other devices within the smart-home environment 100 or receives commands for controlling the pool temperature. Similarly, the smart-home environment 100 may include an irrigation monitor 116 that communicates information regarding irrigation systems within the smart-home environment 100 and/or receives control information for controlling such irrigation systems. According to embodiments, an algorithm is provided for considering the geographic location of the smart-home environment 100, such as based on the zip code or geographic coordinates of the home. The geographic information then may be used to obtain data helpful for determining optimal times for watering. Such data may include sun location information, temperature, dew point, soil type of the land on which the home is located, etc.

By virtue of network connectivity, one or more of the smart-home devices of FIG. 1 can also enable a user to interact with the device even if the user is not proximate to the device. For example, a user can communicate with a device using a computer (e.g., a desktop computer, laptop computer, or tablet) or other portable electronic device (e.g., a smartphone) 166. A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-home environment 100 using a network-connected computer or portable electronic device 166. In some embodiments, the device 166 may be connected to the smart network directly or through additional networks (e.g., WiFi) that are connected to the smart network using one or more devices (e.g., an edge router). In some examples, some or all of the occupants (e.g., individuals who live in the home) can register their device 166 with the smart-home environment 100. Such registration can be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart-home environment 100 may make inferences about which individuals live in the home and are therefore occupants and which devices 166 are associated with those individuals. As such, the smart-home environment "learns" who is an occupant and permits the devices 166 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. For example, a smart-home environment may receive communication from a mobile device of an individual who is known to be or who is registered as a guest or determined to be on a common network (e.g., SSID WiFi network) as the smart devices.

In some embodiments, in addition to containing processing and sensing capabilities, each of the devices 102, 104, 106, 107, 108, 110, 112, 114, 116, 162, 170 and other smart devices (collectively referred to as "the smart devices") may be capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.).

According to embodiments, all or some of the smart devices can serve as wireless or wired repeaters. For example, a first one of the smart devices can communicate with a second one of the smart device via a wireless router 160. The smart devices can further communicate with each other via a connection to a network, such as the Internet 162. Through the Internet 162, the smart devices can communicate with a central server or a cloud-computing system 164. The central server or cloud-computing system 164 can be associated with a manufacturer, support entity, or service provider associated with the device. For some embodiments, a user may be able to contact customer support using a device itself rather than needing to use other communication means such as a telephone or Internet-connected computer. Further, software updates can be automatically sent from the central server or cloud-computing system 164 to the smart devices (e.g., when available, when purchased, or at routine intervals).

As discussed below, the smart devices may be combined to create a mesh network. In some embodiments, this mesh network may include spokesman and low-power nodes in the smart-home environment 100, where some of the smart devices are "spokesman" nodes and others are "low-powered" nodes. Some of the smart devices in the smart-home environment 100 are battery powered, while others have a regular and reliable power source, such as by connecting to wiring (e.g., to 120V line voltage wires) behind the walls 154 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 100 as well as with the central server or cloud-computing system 164. On the other hand, the devices that are battery powered are referred to as "low-power" nodes. These nodes tend to be smaller than spokesman nodes and may communicate using wireless protocols that requires very little power, such as ZigBee, 6LoWPAN, etc. Furthermore, some low-power nodes may also have a relatively low amount of memory to reduce power consumption. Thus, in some embodiments, these low-power nodes utilize streamlined messages and data formats of data (e.g., certificates). Further, some, but not all, low-power nodes are incapable of bidirectional communication. These low-power nodes send messages, but they are unable to "listen". Thus, other devices in the smart-home environment 100, such as the spokesman nodes, cannot send information to these low-power listening-only nodes.

As described, the smart devices serve as low-power and spokesman nodes to create a mesh network in the smart-home environment 100. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 100. The spokesman nodes in the smart-home environment 100 are able to "drop down" to low-powered communication protocols to receive these messages, translate the messages to other communication protocols, and send the translated messages to other spokesman nodes and/or the central server or cloud-computing system 164. Thus, the low-powered nodes using low-power communication protocols are able to send messages across the entire smart-home environment 100 as well as over the Internet 162 to the central server or cloud-computing system 164. According to embodiments, the mesh network enables the central server or cloud-computing system 164 to regularly receive data from all of the smart devices in the home, make inferences based on the data, and send commands back to one of the smart devices to accomplish some of the smart-home objectives described herein.

As described, the spokesman nodes and some of the low-powered nodes are capable of "listening". Accordingly, users, other devices, and the central server or cloud-computing system 164 can communicate controls to the low-powered nodes. For example, a user can use the portable electronic device (e.g., a smartphone) 166 to send commands over the Internet to the central server or cloud-computing system 164, which then relays the commands to the spokesman nodes in the smart-home environment 100. The spokesman nodes drop down to a low-power protocol to communicate the commands to the low-power nodes throughout the smart-home environment, as well as to other spokesman nodes that did not receive the commands directly from the central server or cloud-computing system 164.

An example of a low-power node is a smart nightlight 170. In addition to housing a light source, the smart nightlight 170 houses an occupancy sensor, such as an ultrasonic or passive IR sensor, and an ambient light sensor, such as a photoresistor or a single-pixel sensor that measures light in the room. In some embodiments, the smart nightlight 170 is configured to activate the light source when its ambient light sensor detects that the room is dark and when its occupancy sensor detects that someone is in the room. In other embodiments, the smart nightlight 170 is simply configured to activate the light source when its ambient light sensor detects that the room is dark. Further, according to some embodiments, the smart nightlight 170 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 100 as well as over the Internet 162 to the central server or cloud-computing system 164.

Other examples of low-powered nodes include battery-operated versions of the smart hazard detectors 104. These smart hazard detectors 104 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 104 can send messages that correspond to each of the respective sensors to the other devices and the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore can include more power-consuming components, such as one or more communication chips capable of bidirectional communication in any variety of protocols.

In some embodiments, these low-powered and spokesman nodes (e.g., devices 102, 104, 106, 107, 108, 110, 112, and 170) may function as "tripwires" for an alarm system in the smart-home environment. For example, in the event a perpetrator circumvents detection by alarm sensors located at windows, doors, and other entry points of the smart-home environment 100, the alarm could be triggered upon receiving an occupancy, motion, heat, sound, etc. message from one or more of the low-powered and spokesman nodes in the mesh network. For example, upon receiving a message from a smart nightlight 170 indicating the presence of a person, the central server or cloud-computing system 164 or some other device could trigger an alarm, provided the alarm is armed at the time of detection. Thus, the alarm system could be enhanced by various low-powered and spokesman nodes located throughout the smart-home environment 100. In this example, a user could enhance the security of the smart-home environment 100 by buying and installing extra smart nightlights 170.

In some embodiments, the mesh network can be used to automatically turn on and off lights as a person transitions from room to room. For example, the low-powered and spokesman nodes (e.g., devices 102, 104, 106, 107, 108, 110, 112, and 170) detect the person's movement through the smart-home environment and communicate corresponding messages through the mesh network. Using the messages that indicate which rooms are occupied, the central server or cloud-computing system 164 or some other device activates and deactivates the smart wall switches 108 to automatically provide light as the person moves from room to room in the smart-home environment 100. Further, users may provide pre-configuration information that indicates which smart wall plugs 110 provide power to lamps and other light sources, such as the smart nightlight 170. Alternatively, this mapping of light sources to wall plugs 110 can be done automatically (e.g., the smart wall plugs 110 detect when a light source is plugged into it, and it sends a corresponding message to the central server or cloud-computing system 164). Using this mapping information in combination with messages that indicate which rooms are occupied, the central server or cloud-computing system 164 or some other device activates and deactivates the smart wall plugs 110 that provide power to lamps and other light sources so as to track the person's movement and provide light as the person moves from room to room.

In some embodiments, the mesh network of low-powered and spokesman nodes can be used to provide exit lighting in the event of an emergency or an emergency drill. In some instances, to facilitate this, users provide pre-configuration information that indicates exit routes in the smart-home environment 100. For example, for each room in the house, the user may provide a map of the best exit route depending on availability of the route. In some situations the route may be blocked by a hazard, and an alternate route may be illuminated and indicated, if available. It should be appreciated that instead of a user providing this information, the central server or cloud-computing system 164 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 104 detects smoke and activates an alarm), the central server or cloud-computing system 164 or some other device uses occupancy information obtained from the low-powered and spokesman nodes to determine which rooms are occupied and then turns on lights (e.g., nightlights 170, wall switches 108, wall plugs 110 that power lamps, etc.) along the exit routes from the occupied rooms so as to provide emergency exit lighting.

Also included and illustrated in the smart-home environment 100 of FIG. 1 are service robots 162 each configured to carry out, in an autonomous manner, any of a variety of household tasks. For some embodiments, the service robots 162 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 162 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 162 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 162 is configured to move itself into the immediate presence (e.g., within five feet) of a particular occupant who has settled into a particular location in the home (e.g. in the dining room to eat their breakfast and read the news). The localized-thermostat service robot 162 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 162 proceeds to move and park itself next to the couch and keep that particular immediate space at a comfortable temperature.

Technologies by which the localized-thermostat service robot 162 (and/or the larger smart-home system of FIG. 1) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 162 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 162 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 162, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 162 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 162 can be advised by other smart-home sensors that the temperature and humidity levels are rising in the kitchen, which is nearby to the occupant's current dining room location, and responsive to this advisory the hazard detector service robot 162 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 162 having respective dedicated ones of such functionalities, by a single service robot 162 having an integration of two or more different ones of such functionalities, and/or any combinations thereof (including the ability for a single service robot 162 to have both "away" and "human facing" functionalities) without departing from the scope of the present teachings. Electrical power can be provided by virtue of rechargeable batteries or other rechargeable methods, with FIG. 1 illustrating an exemplary out-of-the-way docking station 164 to which the service robots 162 will automatically dock and recharge its batteries (if needed) during periods of inactivity. Preferably, each service robot 162 includes wireless communication components that facilitate data communications with one or more of the other wirelessly communicating smart-home sensors of FIG. 1 and/or with one or more other service robots 162 (e.g., using Wi-Fi, ZigBee, Z-Wave, 6LoWPAN, etc.), and one or more of the smart-home devices of FIG. 1 can be in communication with a remote server over the Internet. Alternatively or in conjunction therewith, each service robot 162 can be configured to communicate directly with a remote server by virtue of cellular telephone communications, satellite communications, 3G/4G network data communications, or other direct communication method.

Provided according to some embodiments are systems and methods relating to the integration of the service robot(s) 162 with home security sensors and related functionalities of the smart home system. The embodiments are particularly applicable and advantageous when applied for those service robots 162 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to some embodiments is a home automation and security system (e.g., as shown in FIG. 1) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 1. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of multiple known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system 164 are used to provide a personal "smart alarm clock" for individual occupants of the home. For example, user-occupants can communicate with the central server or cloud-computing system 164 via their mobile devices 166 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 100 that happens to be closest to the occupant when the occupant falls asleep will be the device that transmits messages regarding when the occupant stopped moving, from which the central server or cloud-computing system 164 will make inferences about where and when the occupant prefers to sleep. This closest smart device will as be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gait, patterns of movement, voice, height, size, etc. It should be appreciated that facial recognition may also be used.

According to an embodiment, the wake times associated with the "smart alarm clock" are used by the smart thermostat 102 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 102 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-home environment in combination with rules-based inference engines or artificial intelligence provided at the central server or cloud-computing system 164 are used to detect or monitor the progress of Alzheimer's disease. For example, the unique signatures of the occupants are used to track the individual occupants' movement throughout the smart-home environment 100. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 164 analyze the person's migration data collected by the mesh network of the smart-home environment to identify such patterns.

Figure 2:
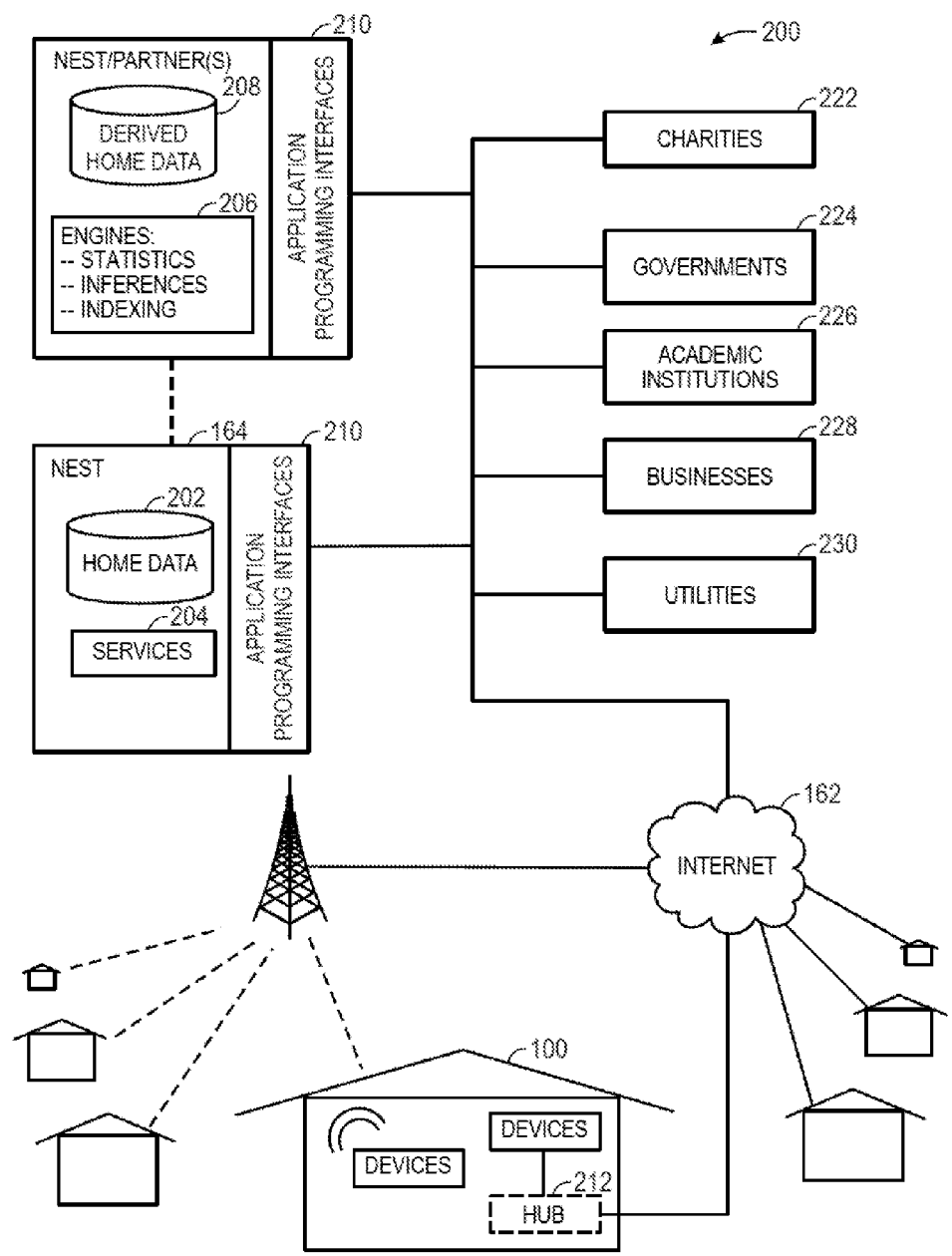
FIG. 2 illustrates a network-level view of an extensible devices and services platform with which the smart-home environment of FIG. 1 can be integrated, according to an embodiment.

FIG. 2 illustrates a network-level view of an extensible devices and services platform 200 with which multiple smart-home environments, such as the smart-home environment 100 of FIG. 1, can be integrated. The extensible devices and services platform 200 includes remote servers or cloud computing architectures 164. Each of the smart devices can communicate with the remote servers or cloud computing architectures 164. For example, a connection to the Internet 162 can be established either directly (for example, using 3G/4G connectivity to a wireless carrier), through a wireless mesh network (which can be a scheme ranging from a simple wireless router, for example, up to and including an intelligent, dedicated whole-home control node), or through any combination thereof. The smart network may couple to the Internet 162 using a hub 212.

Although in some examples provided herein, the devices and services platform 200 communicates with and collects data from the smart devices of smart-home environment 100 of FIG. 1, it should be appreciated that the devices and services platform 200 may communicate with and collect data from multiple smart-home environments across the world. For example, the central server or cloud-computing system 164 can collect home data 202 from the devices of one or more smart-home environments, where the devices can routinely transmit home data or can transmit home data in specific instances (e.g., when a device queries the home data 202). Thus, the devices and services platform 200 may routinely collect data from homes across the world. As described, the collected home data 202 includes, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

The central server or cloud-computing architecture 164 can further provide one or more services 204. The services 204 can include, e.g., software updates, customer support, sensor data collection/logging, weather information, account information, remote access, remote or distributed control, or use suggestions (e.g., based on collected home data 202 to improve performance, reduce utility cost, etc.). Data associated with the services 204 can be stored at the central server or cloud-computing system 164 and the central server or the cloud-computing system 164 can retrieve and transmit the data at an appropriate time (e.g., at regular intervals, upon receiving a request from a user, etc.).

As illustrated in FIG. 2, an embodiment of the extensible devices and services platform 200 includes a processing engine 206, which can be concentrated at a single server or distributed among several different computing entities without limitation. The processing engine 206 can include engines configured to receive data from devices of smart-home environments (e.g., via the Internet or a hubbed network), to index the data, to analyze the data and/or to generate statistics based on the analysis or as part of the analysis. The analyzed data can be stored as derived home data 208.

Results of the analysis or statistics can thereafter be transmitted back to the device that provided home data used to derive the results, to other devices, to a server providing a webpage to a user of the device, or to other non-device entities. For example, use statistics, use statistics relative to use of other devices, use patterns, and/or statistics summarizing sensor readings can be generated by the processing engine 206 and transmitted. The results or statistics can be provided via the Internet 162. In this manner, the processing engine 206 can be configured and programmed to derive a variety of useful information from the home data 202. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 206 can generate statistics about device usage across a population of devices and send the statistics to device users, service providers or other entities (e.g., that have requested or may have provided monetary compensation for the statistics).

According to some embodiments, the home data 202, the derived home data 208, and/or another data can be used to create "automated neighborhood safety networks." For example, in the event the central server or cloud-computing architecture 164 receives data indicating that a particular home has been broken into, is experiencing a fire, or some other type of emergency event, an alarm is sent to other smart homes in the "neighborhood." In some instances, the central server or cloud-computing architecture 164 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. Additionally or alternatively, if a neighbor's hazard detector detect smoke, neighboring houses may activate irrigation systems to reduce likelihood of a spread of fire. It should be appreciated that this safety network can be an opt-in service and that, in addition to or instead of the central server or cloud-computing architecture 164 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing architecture 164 makes inferences about water usage in the home and provides related services. For example, the central server or cloud-computing architecture 164 can nm programs/algorithms that recognize what water sounds like and when it is running in the home. According to one embodiment, to map the various water sources of the home, upon detecting running water, the central server or cloud-computing architecture 164 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 164 to determine the "signature" or "fingerprint" of each water source in the home. This is sometimes referred to herein as "audio fingerprinting water usage."

In one illustrative example, the central server or cloud-computing architecture 164 creates a signature for the toilet in the master bathroom, and whenever that toilet is flushed, the central server or cloud-computing architecture 164 will know that the water usage at that time is associated with that toilet. Thus, the central server or cloud-computing architecture 164 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 164 makes inferences about pest-detection in the home and provides related services. For example, the central server or cloud-computing architecture 164 can nm programs/algorithms that recognize what certain pests sound like, how they move, and/or the vibration they create, individually and/or collectively. According to one embodiment, the central server or cloud-computing architecture 164 can determine the "signatures" of particular types of pests.

For example, in the event the central server or cloud-computing architecture 164 detects sounds that may be associated with pests, it notifies the occupants of such sounds and suggests hiring a pest control company. If it is confirmed that pests are indeed present, the occupants input to the central server or cloud-computing architecture 164 confirms that its detection was correct, along with details regarding the identified pests, such as name, type, description, location, quantity, etc. This enables the central server or cloud-computing architecture 164 to "tune" itself for better detection and create "signatures" or "fingerprints" for specific types of pests. For example, the central server or cloud-computing architecture 164 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 164 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 200 expose a range of application programming interfaces (APIs) 210 to third parties, such as charities 222, governmental entities 224 (e.g., the Food and Drug Administration or the Environmental Protection Agency), academic institutions 226 (e.g., university researchers), businesses 228 (e.g., providing device warranties or service to related equipment, targeting advertisements based on home data), utility companies 230, and other third parties. The APIs 210 may be coupled to and permit third-party systems to communicate with the central server or the cloud-computing system 164, including the services 204, the processing engine 206, the home data 202, and the derived home data 208. For example, APIs 210 may allow applications executed by the third parties to initiate specific data processing tasks that are executed by the central server or the cloud-computing system 164, as well as to receive dynamic updates to the home data 202 and the derived home data 208.

For example, third parties can develop programs and/or applications, such as web or mobile apps that integrate with the central server or the cloud-computing system 164 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 202 and the derived home data 208, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 3:
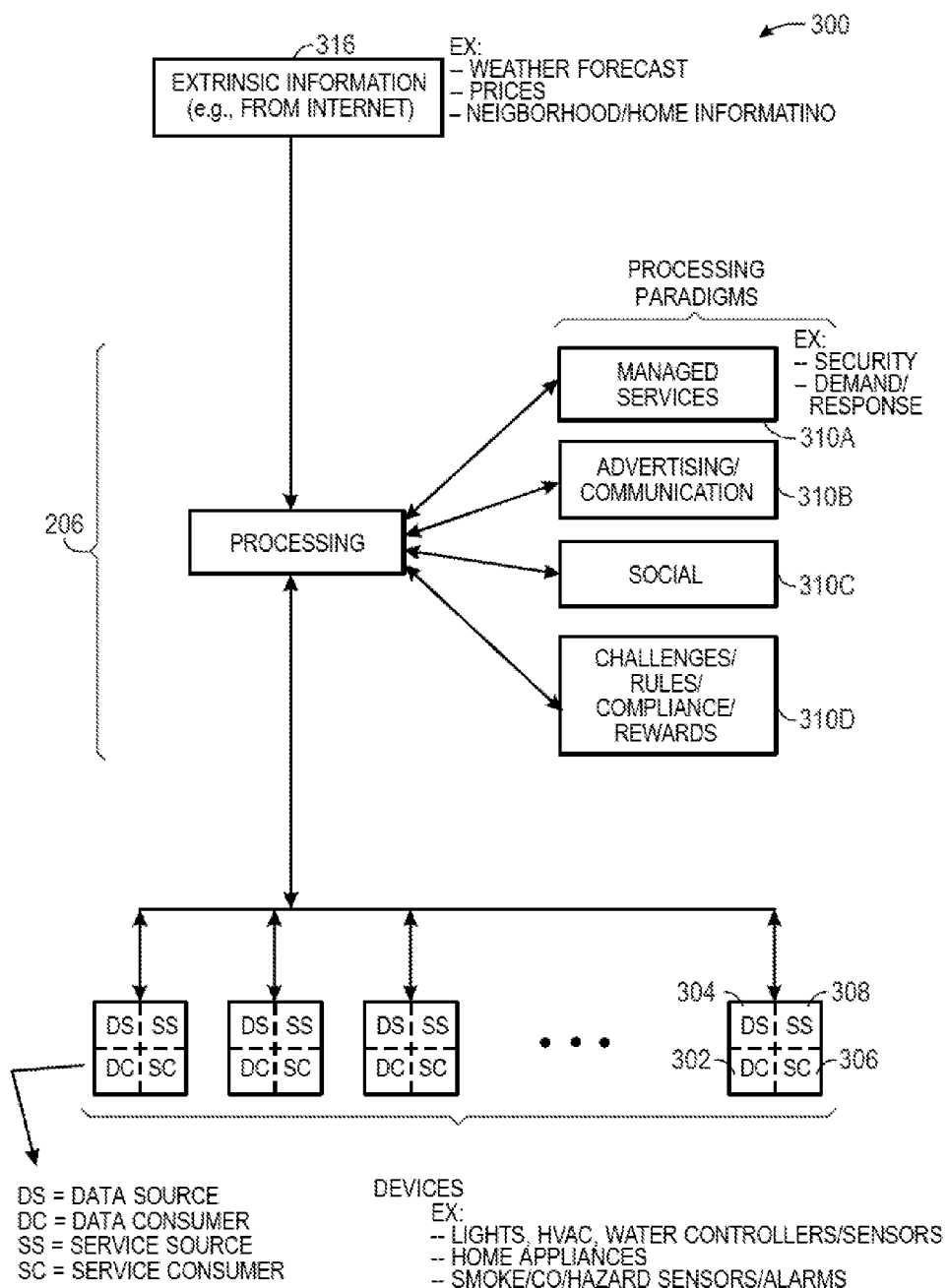
FIG. 3 illustrates a functional view of the extensible devices and services platform of FIG. 2, with reference to a processing engine as well as devices of the smart-home environment, according to an embodiment.

FIG. 3 illustrates a functional view 300 of the extensible devices and services platform 200 of FIG. 2, with particular reference to the processing engine 206 as well as devices, such as those of the smart-home environment 100 of FIG. 1. Even though devices situated in smart-home environments may have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform 200 can also be configured to harness the large amount of data that is flowing out of these devices. In addition to enhancing or optimizing the actual operation of the devices themselves with respect to their immediate functions, the extensible devices and services platform 200 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310*a* that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310*b* that estimates characteristics (e.g., demographic information), desires and/or products of interest of a user based on device usage. Services, promotions, products or upgrades can then be offered or automatically provided to the user. Processing engine 206 can further include a social paradigm 310*c* that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

The processing engine 206 can include a challenges/rules/compliance/rewards paradigm 310*d* that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 206 may integrate or otherwise utilize extrinsic information 316 from extrinsic sources to improve the functioning of one or more processing paradigms. Extrinsic information 316 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits may be brought about by, and fit within the scope of, the described extensible devices and services platform 200, ranging from the ordinary to the profound. Thus, in one "ordinary" example, each bedroom of the smart-home environment 100 can be provided with a smart wall switch 108, a smart wall plug 110, and/or smart hazard detectors 104, all or some of which include an occupancy sensor, wherein the occupancy sensor is also capable of inferring (e.g., by virtue of motion detection, facial recognition, audible sound patterns, etc.) whether the occupant is asleep or awake. If a fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

Smart Devices

Figure 4:
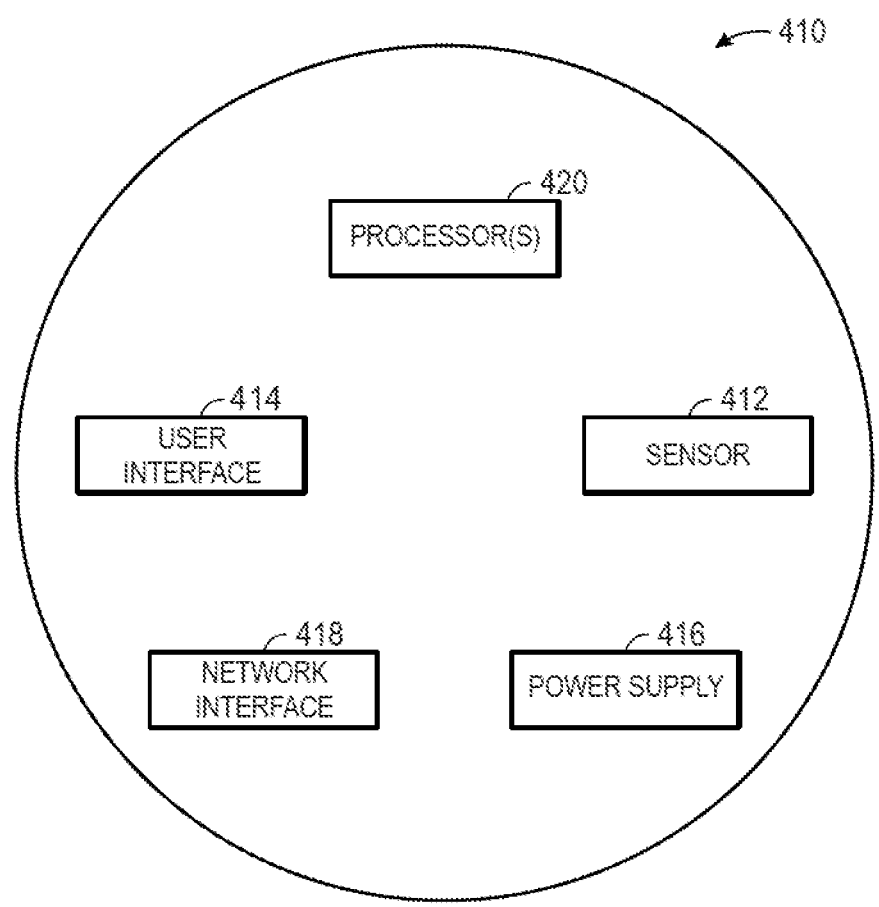
FIG. 4 illustrates block diagram view of a smart device that may securely communicate with other smart devices within the smart-home environment, according to an embodiment.

By way of introduction, FIG. 4 illustrates an example of a device 410 (e.g., thermostat and/or hazard detector) that may that may communicate with other like devices within a home environment. In one embodiment, the device 410 may include one or more sensors 412, a user interface component 14, a power supply 416 (e.g., including a power connection and/or battery), a network interface 418, a processor 420, and the like. Particular sensors 412, user interface components 414, and power-supply configurations may be the same or similar within each device 410. However, it should be noted that in some embodiments, each device 410 may include particular sensors 412, user interface components 414, power-supply configurations, and the like based on a device type or model.

The sensors 412, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals, or fields, or the like. As such, the sensors 412 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s), radiofrequency identification detector(s) and/or other suitable sensors. While FIG. 4 illustrates an embodiment with a single sensor, many embodiments may include multiple sensors. In some instances, the device 410 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives, security objectives, safety objectives, and/or smart-operation objectives.

One or more user interface components 414 in the device 410 may receive input from the user and/or present information to the user. The received input may be used to determine one or more settings. In certain embodiments, the user interface components may include a mechanical or virtual component that responds to the user's motion. For example, the user may mechanically move a sliding component (e.g., along a vertical or horizontal track) or rotate a rotatable ring (e.g., along a circular track), or move an object (e.g., finger) across/onto a touchpad of the device 410. Such motions may correspond to a setting adjustment, which can be determined based on an absolute position of a user interface component 414 or based on a displacement of a user interface components 414 (e.g., adjusting a set point temperature by 1 degree F for every 10° rotation of a rotatable-ring component). Physically and virtually movable user interface components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user interface component may be associated with a magnitude of a setting adjustment, such that a user may dramatically alter a setting with a large movement or finely tune a setting with s small movement.

The user interface components 414 may also include one or more buttons (e.g., up and down buttons), a keypad, a number pad, a switch, a microphone, and/or a camera (e.g., to detect gestures). In some embodiments, the user interface component 414 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user interface component 414 may include a camera that may detect gestures (e.g., to indicate that a power or alarm state of a device is to be changed). In some instances, the device 410 may have one primary input component, which may be used to set a plurality of types of settings. The user interface components 414 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 410 to a power source such as a line voltage source. In some instances, an AC power source can be used to repeatedly charge a (e.g., rechargeable) local battery, such that the battery may be used later to supply power to the device 410 when the AC power source is not available.

The network interface 418 may include a component that enables the device 410 to communicate between devices. In one embodiment, the network interface 418 may communicate using an efficient network layer as part of its Open Systems Interconnection (OSI) model. In one embodiment, the efficient network layer, which will be described in more detail below with reference to FIG. 5, may enable the device 410 to wirelessly communicate IPv6-type data or traffic using a RIPng routing mechanism and a DTLS security scheme. As such, the network interface 418 may include a wireless card or some other transceiver connection.

The processor 420 may support one or more of a variety of different device functionalities. As such, the processor 420 may include one or more processors configured and programmed to carry out and/or cause to be carried out one or more of the functionalities described herein. In one embodiment, the processor 420 may include general-purpose processors carrying out computer code stored in local memory (e.g., flash memory, hard drive, and random access memory), special-purpose processors or application-specific integrated circuits, combinations thereof, and/or using other types of hardware/firmware/software processing platforms. Further, the processor 420 may be implemented as localized versions or counterparts of algorithms carried out or governed remotely by central servers or cloud-based systems, such as by virtue of running a Java virtual machine (JVM) that executes instructions provided from a cloud server using Asynchronous JavaScript and XML (AJAX) or similar protocols. By way of example, the processor 420 may detect when a location (e.g., a house or room) is occupied, up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an IP address of a received signal, detecting operation of one or more devices within a time window, or the like. Moreover, the processor 420 may include image recognition technology to identify particular occupants or objects.

In certain embodiments, the processor 420 may also include a high-power processor and a low-power processor. The high-power processor may execute computational intensive operations such as operating the user interface component 414 and the like. The low-power processor, on the other hand, may manage less complex processes such as detecting a hazard or temperature from the sensor 412. In one embodiment, the low-power processor may wake or initialize the high-power processor for computationally intensive processes.

In some instances, the processor 420 may predict desirable settings and/or implement those settings. For example, based on the presence detection, the processor 420 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the processor 420 may initiate an audio or visual indicator of where the person, animal or object is or may initiate an alarm or security feature if an unrecognized person is detected under certain conditions (e.g., at night or when lights are off).

In some instances, devices may interact with each other such that events detected by a first device influences actions of a second device. For example, a first device can detect that a user has pulled into a garage (e.g., by detecting motion in the garage, detecting a change in light in the garage or detecting opening of the garage door). The first device can transmit this information to a second device via the efficient network layer, such that the second device can, e.g., adjust a home temperature setting, a light setting, a music setting, and/or a security-alarm setting. As another example, a first device can detect a user approaching a front door (e.g., by detecting motion or sudden light pattern changes). The first device may, e.g., cause a general audio or visual signal to be presented (e.g., such as sounding of a doorbell) or cause a location-specific audio or visual signal to be presented (e.g., to announce the visitor's presence within a room that a user is occupying).

By way of example, the device 410 may include a thermostat such as a Nest® Learning Thermostat. Here, the thermostat may include sensors 412 such as temperature sensors, humidity sensors, and the like such that the thermostat may determine present climate conditions within a building where the thermostat is disposed. The power-supply component 16 for the thermostat may be a local battery such that the thermostat may be placed anywhere in the building without regard to being placed in close proximity to a continuous power source. Since the thermostat may be powered using a local battery, the thermostat may minimize its energy use such that the battery is rarely replaced.

In one embodiment, the thermostat may include a circular track that may have a rotatable ring disposed thereon as the user interface component 414. As such, a user may interact with or program the thermostat using the rotatable ring such that the thermostat controls the temperature of the building by controlling a heating, ventilation, and air-conditioning (HVAC) unit or the like. In some instances, the thermostat may determine when the building may be vacant based on its programming. For instance, if the thermostat is programmed to keep the HVAC unit powered off for an extended period of time, the thermostat may determine that the building will be vacant during this period of time. Here, the thermostat may be programmed to turn off light switches or other electronic devices when it determines that the building is vacant. As such, the thermostat may use the network interface 418 to communicate with a light switch device such that it may send a signal to the light switch device when the building is determined to be vacant. In this manner, the thermostat may efficiently manage the energy use of the building.

Figure 5:
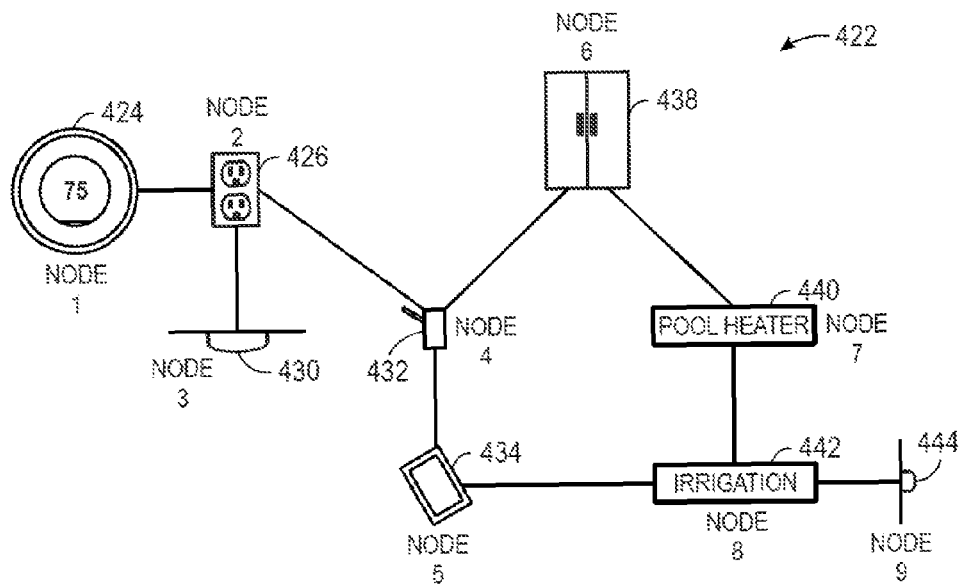
FIG. 5 illustrates a schematic view of devices interconnected within the smart-home environment, according to an embodiment.

Keeping the examples of FIGS. 1-4 in mind, FIG. 5 illustrates an example wireless mesh network 422 that may be employed to facilitate communication between some of the devices, such as those described above. As shown in FIG. 5, a thermostat 424 may have a direct wireless connection to a plug interface 426, which may be wirelessly connected to a hazard detection unit 430 and to a light switch 432. In the same manner, the light switch 432 may be wirelessly coupled to a portable electronic device 436 and an appliance 434. The appliance 438 may just be coupled to a pool heater 440 and the portable electronic device 434 may just be coupled to an irrigation system 442. The irrigation system 442 may have a wireless connection to an entryway interface device 444.

Figure 6:
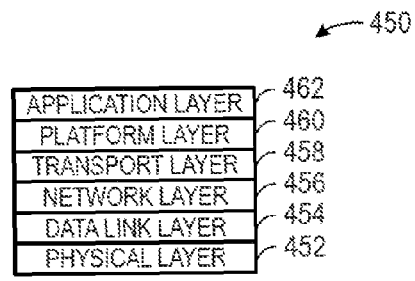
FIG. 6 illustrates a model view that illustrates functions of a communication system in layers including an application layer, a transport layer, and a network layer, according to an embodiment.

Generally, the network 422 may be part of an Open Systems Interconnection (OSI) model 450 as depicted in FIG. 6. The OSI model 450 illustrates functions of a communication system with respect to abstraction layers. That is, the OSI model may specify a networking framework or how communications between devices may be implemented. In one embodiment, the OSI model 450 may include six layers: a physical layer 452, a data link layer 454, a network layer 456, a transport layer 458, a platform layer 460, and an application layer 462. Generally, each layer in the OSI model 450 may serve the layer above it and may be served by the layer below it.

Keeping this in mind, the physical layer 452 may provide hardware specifications for devices that may communicate with each other. As such, the physical layer 452 may establish how devices may connect to each other, assist in managing how communication resources may be shared between devices, and the like.

The data link layer 454 may specify how data may be transferred between devices. Generally, the data link layer 454 may provide a way in which data packets being transmitted may be encoded and decoded into bits as part of a transmission protocol.

The network layer 456 may specify how the data being transferred to a destination node is routed. The network layer 456 may also interface with a security protocol in the application layer 462 to ensure that the integrity of the data being transferred is maintained.

The transport layer 458 may specify a transparent transfer of the data from a source node to a destination node. The transport layer 458 may also control how the transparent transfer of the data remains reliable. As such, the transport layer 458 may be used to verify that data packets intended to transfer to the destination node indeed reached the destination node. Example protocols that may be employed in the transport layer 458 may include Transmission Control Protocol (TCP) and User Datagram Protocol (UDP).

The platform layer 460 may establish connections between devices according to the protocol specified within the transport layer 458. The platform layer 460 may also translate the data packets into a form that the application layer 462 may use. The application layer 462 may support a software application that may directly interface with the user. As such, the application layer 462 may implement protocols defined by the software application. For example, the software application may provide serves such as file transfers, electronic mail, and the like.

Figure 7:
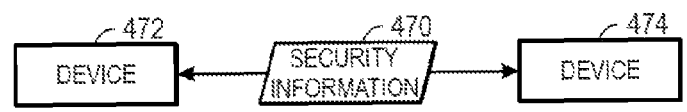
FIG. 7 illustrates an exchange of information between devices, with at least one device being part of the smart-home environment, according to an embodiment.

The network layer 456 may route data between the devices 10 using a communication protocol based on Internet Protocol version 6 (IPv6). As such, each device 410 may include a 128-bit IPv6 address that may provide each device 410 with a unique address to use to identify itself over the Internet, a local network or a fabric overlaying a group of networks, or the like. In some embodiments, the network layer 456 may identify a protocol (e.g., RIPng) that determines how data is routed between the devices. As illustrated in FIG. 7, using one or more layers, information 470 may be exchanged between devices 472 and 474.

Figure 8:
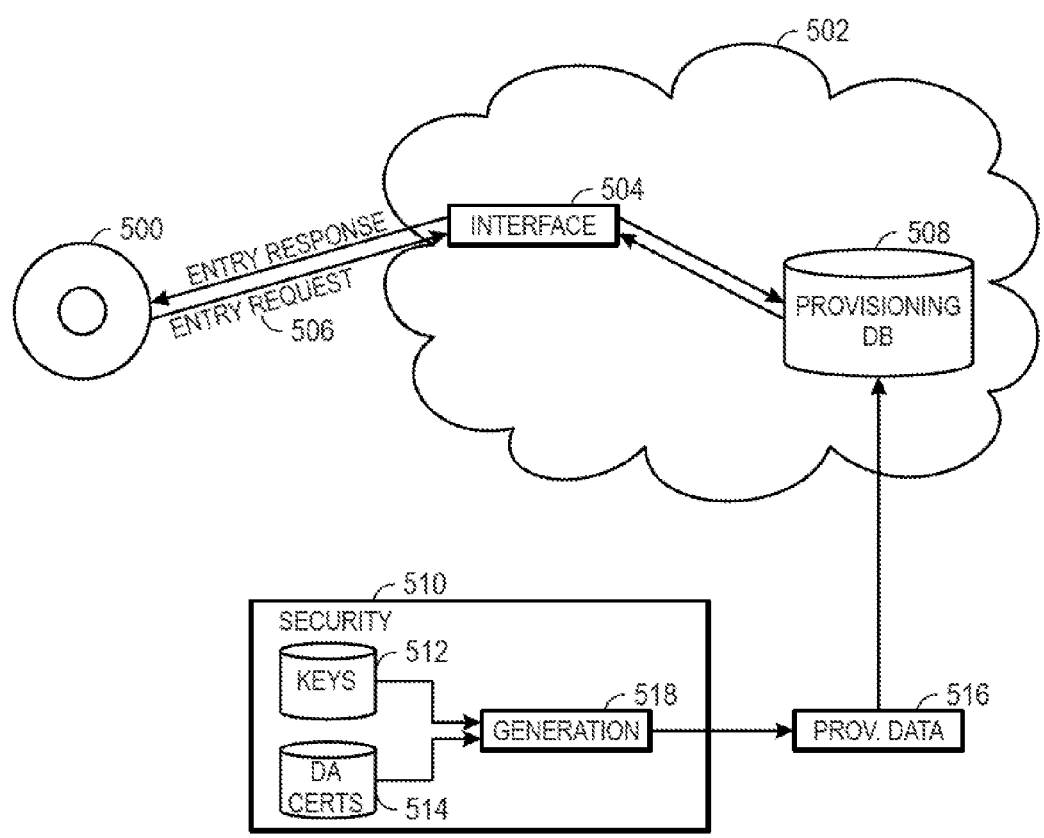
FIG. 8 illustrates a schematic view of a process for updating a device with provisioning data via a service, according to an embodiment.

As illustrated in FIG. 8, when a device 500 connects to a service 502 (e.g., the device is to be updated and/or added to a network or a common fabric among a group of networks), the new device may be missing one or more features or information that may be used to join the network or fabric. Thus, during operation of the device 500, the device 500 connects to a service 502. In some embodiments, the device 500 may connect to the service 502 as part of a normal operation (e.g., daily update, data request, etc.), and a header for the desired operation indicates that the device 500 does not have provisioning information. As will be discussed below, at least a portion of the communication with the service 502 occurs through an interface 504 for the device. For example, the interface 504 may include a server in a group of servers used to implement the cloud. The interface 504 may redirect incoming traffic to the appropriate locations within the service 502 or take appropriate actions in response to requests received from devices connected to the service 502. For example, when the interface 504 receives an entry request 506 from the device 500, the interface 504 determines that the device 500 should receive provisioning data from a provisioning database 508.

In some embodiments, the provisioning database 508 may be populated with information from a security station 510 that includes lists of keys 512, certificates 514, and/or other security information. This security information is used to generate provisioning data 516 for devices. In certain embodiments, the provisioning data 516 is indexed in the provisioning database 508 and stored along with other information. For example, each entry in the provisioning database 508 may include data, such as that illustrated in Table 1 below.

TABLE 1

| Provisioning database fields and field types. | |
|---|---|
| Data contained | Format |
| Device Serial Number | String |
| Device ID | 64-bit integer |
| Provisioning data | String |

In some embodiments, the Device ID may be a MAC address used to connect the device 500 to a network. However, in some embodiments, the device 500 may not have access to this number until provisioned using the provisioning database 508 entry. Thus, in such embodiments, the device 500 may only know the device serial number. Thus, in such embodiments, requests from the device 500 may be referenced by serial number. Accordingly, in some embodiments, the provisioning database 508 entries may be indexed by the device serial number.

In some embodiments, to ensure security, this data 516 is generated by a generation unit 518 that is in the security station 510 that is offline in a secure location. In other words, the security station 510 is securely separate from the service 502 and/or the provisioning database 508. Thus, in such embodiments, a request to the service 502 for the data 516 may not include direct access by the service 502 to the keys 512.

The securely-generated provisional data 516 is provided to the provisioning database 508 to be sent to respective devices. In certain embodiments, the provisional data 516 is stored in an encrypted format that blocks unauthorized access. For example, the provisional data 516 may be encrypted using Advanced Encryption Standard 256 in Cipher-Block-Chaining Mode (AES256CBC) or other suitable encryption techniques.

Moreover, in some embodiments, the service 502 may not have access to the decryption keys for the data 516, and the keys used to decrypt the data 516 may be specific to the device 500 for whom the data 516 is intended. In some embodiments, each entry of provisional data 516 in the provisioning database 508 may be linked to a specific device using some identifier (e.g., serial number) for the device. For example, the encryption (and integrity) keys may be derived from a default secret stored in the device 500 using a suitable encryption algorithm (e.g., HMAC-based Extract-and-Expand Key Derivation Function Hashed Message Authentication Code, Secure Hash Algorithm—HDKF-HMAC-SHA256 algorithm). Moreover, the device's serial number and a fixed string may be provided to the algorithm's info input. Thus, in such embodiments, each provisional data 516 entry in the provisioning database 508 may be specific to a particular device, and the key for the provisional data 516 entry is bound to the device 500. In some embodiments, at least some information used to couple the device 500 to a respective fabric and/or network may not be included in the provisional data 516 because such information is not accessible by the service 500. Instead, in such embodiments, the relevant information may be acquired from devices already present in the fabric and/or network to be joined.

In some embodiments, using the unique identifier for the device, the service 500 sends an entry request that includes the provisioning data 516 to enable the device to join or create a network and/or a fabric using information provided in the provisioning data 516.

Figure 9:
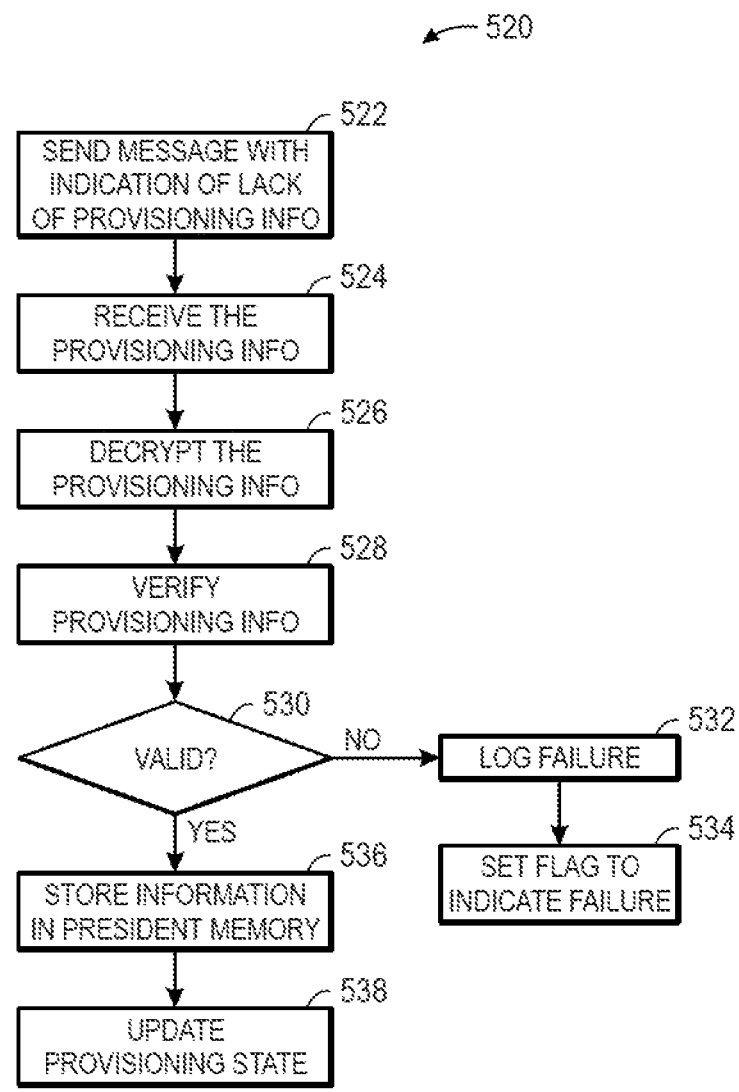
FIG. 9 illustrates a flowchart view of a process for updating the device of FIG. 8, according to an embodiment.

FIG. 9 illustrates a flow chart illustrating a process 520 for receiving provisioning data (e.g., provisioning data 516) that may be used by a receiving device (e.g., device 500) to join a network or fabric. The process 520 begins when the device sends a message with an indication of a lack of provisioning data. In some embodiments, the device may send the message to a service, another device on the network, any device with the requested information. For example, in some embodiments, one or more message types (e.g., general message or a provisioning data request message) sent to a service with which the device communicates may include a header related to a provisioning state for the device. For example, the message may indicate that the device is provisioned, not provisioned, or a previous attempt at provisioning failed. As discussed below, when the message includes an indication that the device is not provisioned, the device may receive the provisioning info (block 524). For example, the device may receive the response from the service or from a device having the provisioning information.

In some embodiments, the device may receive the provisioning in an encrypted format (e.g., AES-256-CBC) using an encryption key derived from a secret known to the device, as previously discussed. Using the encryption key, the device decrypts the provisioning information (block 526). In some embodiments, decrypting the provisioning information comprises deriving the encryption key using the secret known to the device used to encrypt the provisioning information. In some embodiments, only a portion of the received data is encrypted. For example, the received message may include a device serial number, a MAC address for the device, and the provisioning information. In some of these embodiments, only the provisioning information is encrypted while the device serial number and the MAC address are not encrypted.

Before, during, and/or after the provisioning information is decrypted, the device may verify that the received data is valid (block 528). For example, in some embodiments, the device may decode a certificate in the provisioning information and verify that the ID for the certificate matches the device ID, verify that a private key in the provisioning information matches a public key in the device certificate, and/or verify that the pairing code includes a valid check digit. Moreover, in some embodiments, the provisioning information may include an integrity check value generated using an integrity key also derived from the secret known to the device. For example, in certain embodiments, the provisioning information may include an HMAC-SHA256 integrity check value. In some embodiments, the verification of validity of the received data may also include verifying, by the device or the service, that the device does not already have provisioning information. Based on verification information, the device determines whether the update to the device is valid (block 530). For example, if any of the foregoing verification steps fail, the update may be deemed invalid. Furthermore, in some embodiments, the device may verify that provisioning information has been stored in the device. Moreover, if one or more expected portions (e.g., certificate, pairing code, and/or private key) are determined to be missing from the device's memory, the update may be logged as invalid.

If the provisioning information update is invalid, the device logs a failure to add valid provisioning information (block 532). In some embodiments, logging the failure includes removing the invalid provisioning information from memory so that no impartial updates are stored. Therefore, if the device is updated with the provisioning information, the device has received all relevant information. Based on the logged failure, the device may flag one or more messages to indicate failure to update the device with the provisioning information (block 534). For example, the provisioning state header may be marked as last provisioning failed so that the next related message (e.g., update request message) sent by the device to the service may be logged by the service.

In some embodiments, only if the provisioning information update is deemed valid, the device stores the information in persistent memory (block 536). Once the information is stored in memory, the device updates it provisioning state (block 538). In some embodiments, this update may be sent to the service immediately, but in other embodiments, the device may send the updated state when the next scheduled or desired message is sent to the service. In some embodiments, if the device fails to store the provisional information and is unable to do so, the device may instead update the provisioning state of the next message to a last provisioning failed state for the next message. In other embodiments, the default value for the provisioning state may be a failed last provisioning. Thus, in such embodiments, if an update fails, the device may leave the last update failed intact. However, in some embodiments, the headers may include a type of failure. Therefore, when updating the status, the device may update the failure from the default failure to a relevant failure type.

Service

Figure 10:
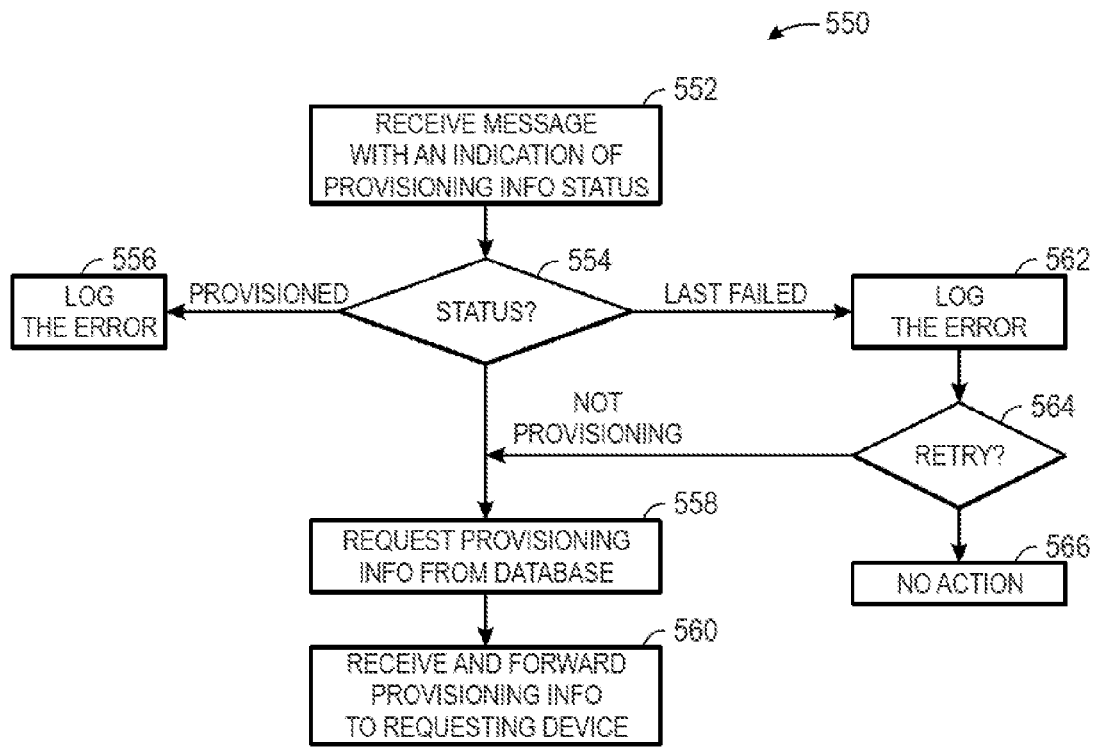
FIG. 10 illustrates a flowchart view of a process for updating the device of FIG. 8 using the service of FIG. 8, according to an embodiment.

FIG. 10 illustrates a process 550 for sending provisioning information updates to a device requesting provisioning information. The process 550 begins when the service receives a message with an indication of provisioning info status (block 552). For example, the message may be a provisioning update request or another message type with header information identifying the device. The service (e.g., service interface 504) determines the provisioning status of the device sending the message (block 554). For example, the service may determine if a header of a message includes a provisioned status, a not provisioned status, or a last provisioning failed status. In some embodiments, the service may treat messages lacking the provisioning header as including a not provisioned status. In other embodiments, when messages lack the provisioning header, the service may determine that the device is not provisioning compatible and will treat the message in the same manner as it would a device that is already provisioned. Specifically, when the service determines that the device is already provisioned, the service makes no further provisioning actions (block 556).

If the service determines that the state of the device is "not provisioned," the service may request provisioning information from a database storing such information (block 558). For example, the original message received by the service may include a device identifier (e.g., device serial number) that may be used to lookup the particular provisioning information relevant to the device that is stored in a provisioning database. Moreover, in some embodiments, the device identifier may also be included in the headers also used to determine the provisioning state of the device.

The service may receive a response from the database that includes the provisioning information for the particular device and forward the information to the device (block 560). In some embodiments, the service may determine whether a device ID in the request header matches a device ID in the provisioning information. If the device IDs do not match, in some embodiments, the service will log the error and take no further action. In other embodiments, the service will log the error and forward the error to an appropriate place. However, if the device IDs do match, the service has completed the appropriate actions until a next message from the device is received that indicates whether the provisioning has completed or has failed. As discussed previously, in some embodiments, the service may be incapable of decrypting the provisioning information. Furthermore, in some embodiments, it may be desirable to delay an update of provisioning system by the service. In such cases, the service may send a response to the device that omits the provisioning data headers. The device may determine that the service does not want to update the information currently. Instead, the device may send the provisioning state headers and device ID information in subsequent communications with the service.

If the service determines that the last provisioning attempt for the device has failed, the service may log the error (block 562). Upon logging the error, the service may determine whether to retry the update or not (block 564). For example, the service may determine whether a retry flag has been set to true or false. Moreover, in some embodiments, the retry flag may be an operator configurable option that may be set by the user. If the flag is set to false, the service may take no further action (block 566). However, if the flag is set to true, the service may proceed as if the provisioning state had been set to not provisioned.

Security Station

Figure 11:
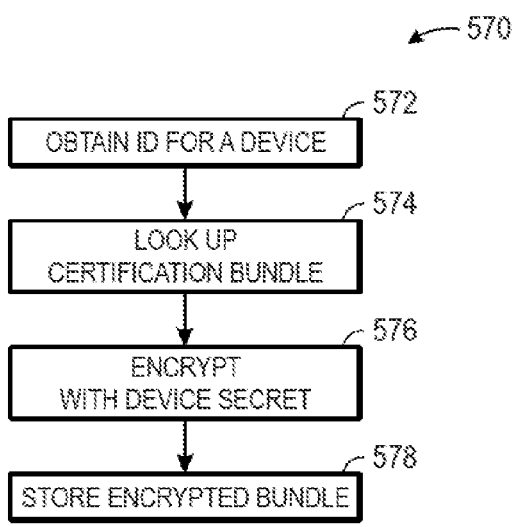
FIG. 11 illustrates a flowchart view of a process for creating a provisioning data bundle, according to an embodiment.

FIG. 11 illustrates a process 570 for generating and storing certification bundles for devices deployed in-field. The process 570 includes obtaining a device ID for device (block 572). In some embodiments, obtaining the device ID may include receiving or accessing a list of device IDs in a database either locally stored or remotely accessed. The process 570 further includes looking up a certification bundle for the device (block 574). For example, the certification bundle may be a bundle of certification details that the device may use to connect to a fabric or network, but the device did not did not have the certification bundle at the time that the device was deployed. Thus, the device was unable to join a particular fabric or network (e.g., 802.15.4) at the time of deployment. Furthermore, the certification bundle may include a certificate for the device, a private key to be used by the device, and/or a pairing code for the device.

Using the device ID, the certification bundle is encrypted using a key that is stored on the device at time of manufacture (block 576). Thus, the certification bundle may be encrypted in a format that the device for which the bundle in intended is able to decrypt the bundle while one or more intermediate devices are unable to access the certification bundle. In some embodiments, the encryption may be created using any suitable algorithm, such as the HDKF-HMAC-SHA256 algorithm. Once the credential bundle is encrypted, the encrypted bundle may be stored (block 578). In some embodiments, additional information may be added to the credential bundle such as an unencrypted device ID and a device serial number, and the additional information may be included with the encrypted bundle to form provisioning information. Moreover, in some embodiments, storing the bundle may include sending the encrypted bundle to a remote location (e.g., provisioning database 508) for storage.

Network/Fabric Joining Using the Provisioning Information

Figure 12:
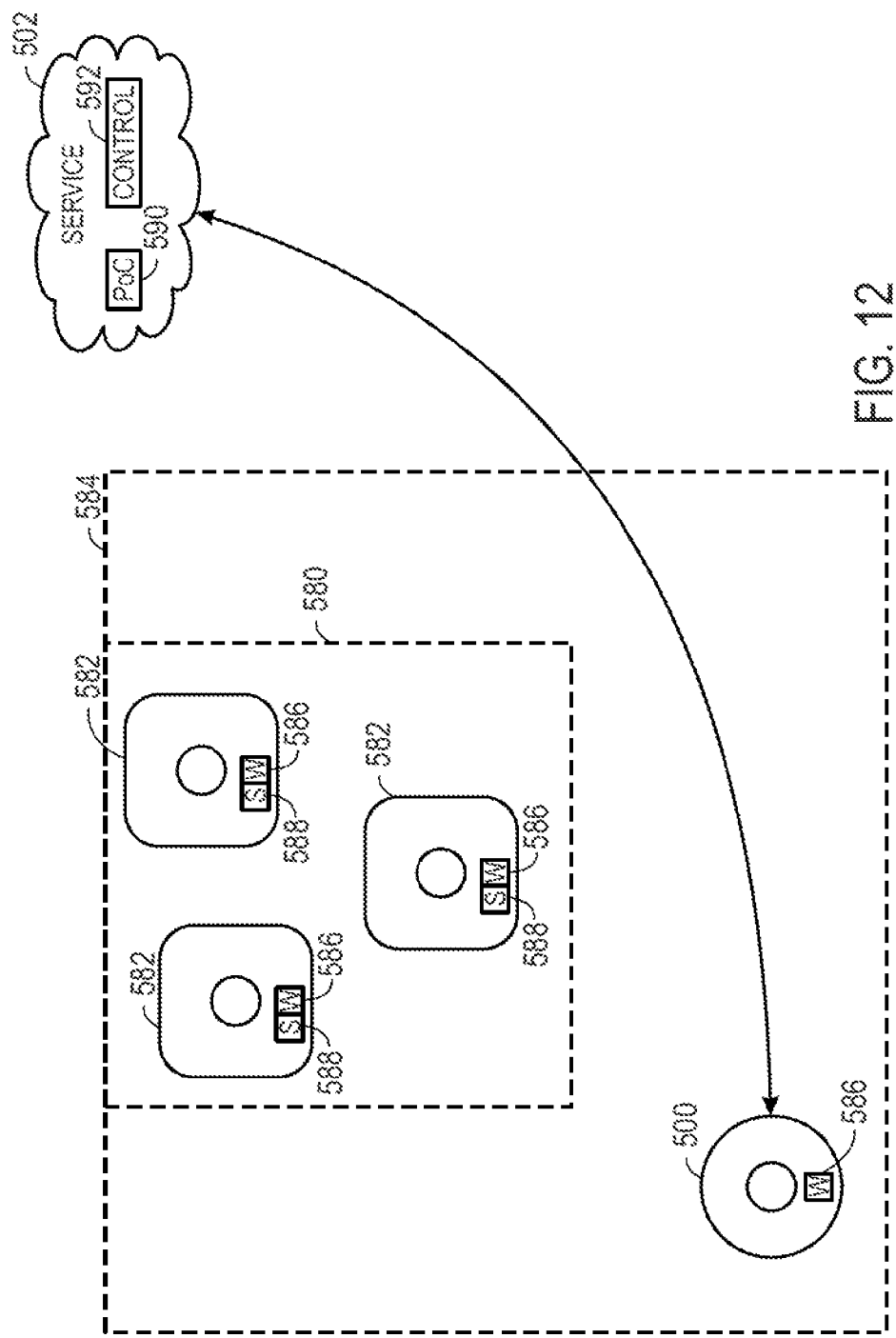
FIG. 12 illustrates a schematic view of a network or fabric to be joined by a joining device using assisting devices and a service, according to an embodiment.

In some embodiments, the provisioning information may provide the device with an ability to join a network or fabric. However, the device may still lack some network/fabric specific information. For example, the device may not have a fabric/network name and/or respective keys for joining the fabric/network. In some embodiments, the service may not have had this information to share with the device. FIG. 12 illustrates a schematic view of an arrangement of a communication between the device 500 and the service 502. It may also be desirable to connect to a network/fabric 580. For example, if the network/fabric 580 is considered as a fabric, devices 582 may be interconnected using one or more networks (e.g., network 584) which are overlaid with a fabric that provides an additional layer of security and/or routing communications between the devices 582 using one or more networks. If the network/fabric 580 is considered as a network, the devices 582 may all be connected via the network 580 and may also be connected via in additional layer through a fabric. Furthermore, the network 580 may be a first network type (e.g., 802.15.4.) and the network 584 may be a second network type (e.g., WiFi). Each of the networks may include edge routers that enable the networks 580, 584 to connect to outside devices (e.g., the service 502) via the Internet. In some embodiments, the devices 582, 584 may be connected to the network 584 using a set of security credentials 586. For example, if the network 584 is a WiFi network, the security credentials may include an SSID and password for the network and one or more other parameters, such as security type or ports for communication. The devices 582 may also include security credentials 588 for connecting to the network/fabric 580. For example, for an 802.15.4 network, the security credentials 588 may include a personal area network (PAN) name and a key. For a fabric, the security credentials 588 may include a fabric ID and a fabric key. In some embodiments, the fabric ID and the fabric key may be generated by a first device that creates the fabric then shared with subsequent devices. The device 500 does not have the fabric credentials or the network credentials. Thus, the device 500 may retrieve the fabric and/or network credentials from the device 582. The service 502 may assist in this retrieval without actually receiving the credentials thereby encouraging security of the networks and fabrics by ensuring that the security credentials do not leave the networks. Thus, in such embodiments, the service 502 cannot act as a single point of failure leading to vulnerability of the networks and/or fabrics were the service 502 to be compromised. To utilize this communication between the device 500 and the devices 582, the service 502 may include a point of contact 590 through which the devices 500, 582 may connect to the service. The service 502 may also include control logic 592 that may be used to connect and/or control one or more devices (e.g., thermostats, HVAC) from the service 502.

The control logic 592 may include a server within the service 502 and maintains buckets of information associated with each device. In some embodiments, when a device is updated to incorporate updates for the device 500, the update adds new field/value pairs that include the assisting device ID. For example, the control logic 592 may include buckets such as those described in U.S. Pat. No. 8,635,373 entitled "Subscription-Notification Mechanisms for Synchronization of Distributed States," filed on Sep. 22, 2012, incorporated by reference in its entirety.

Figure 13:
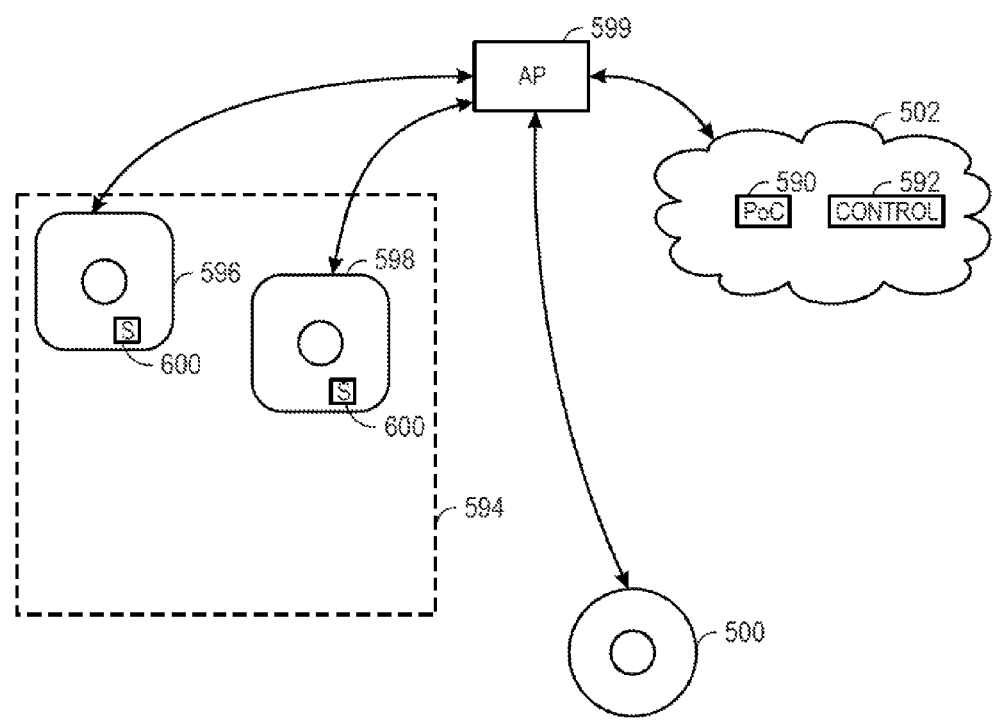
FIG. 13 illustrates a schematic view of a network to be joined by a joining device using assisting devices and a service, according to an embodiment.

FIG. 13 illustrates a schematic view of the device 500 joining a network 594. In some embodiments, the network 594 to be joined may not be usable unless one of its included devices broadcasts availability of the network. In certain embodiments, the network 594 may include devices 596, 598 that connect to each other through a first network type (e.g., 802.15.4) and to the service 502 via an access point 599 of another network type (e.g., 802.11). The joining device 500 may also connect to the service 502 via the access point 599. Moreover, in some embodiments, the devices 596, 598 may be sleepy devices that are not always on. Thus, in such embodiments, the device 500 should attempt to connect to the network when the devices 596, 598 are awake. To connect to one of the devices 596, 598, the device 500 may rely upon the service 502 to determine when one of the device 596, 598 is awake and to notify the device 500. In some embodiments, the device 500 may also be a sleepy device. In such embodiments, the service 502 may awaken the device 500 when the time has come for the device 500 to attempt to connect to device 596 or device 598.

As discussed below, the service 502 respond to the joining device 500 with a response indicating which device in the network 594 may assist the joining device 500 in joining the network 594. As discussed below, the service 502 may also provide the device 500 with some authentication (e.g., authentication information, token, access token) for communication with the device 596 or the device 598. Using this authentication information, the device 500 may connect to one of the devices and request security credentials 600 for the network 594. In some embodiments, the response to the first communication from the device 500 to the service 502 may include the authentication information. In other embodiments, the authentication information may be sent at a separate time in response to a token request by the joining device 500.

Joining Device

Figure 14:
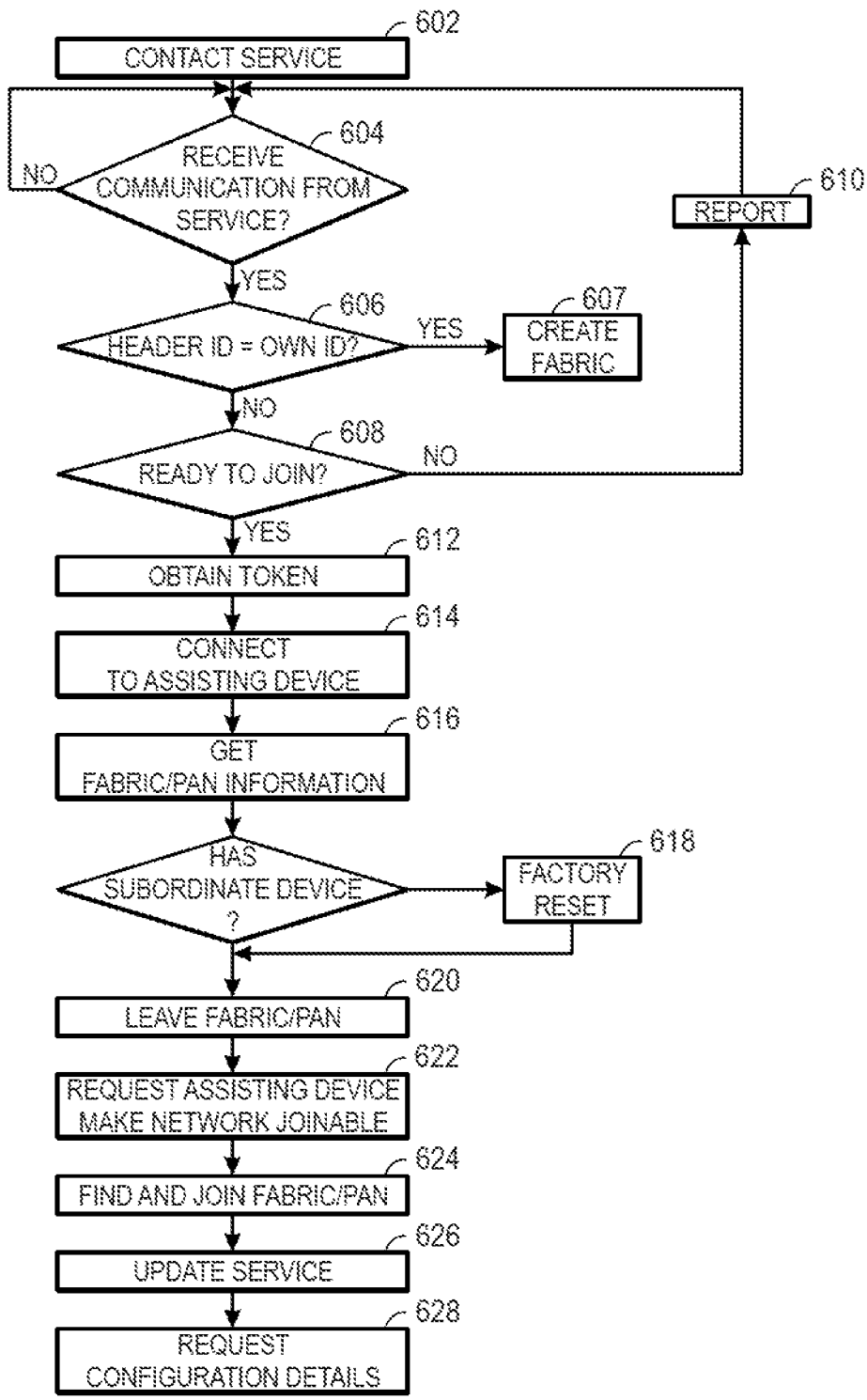
FIG. 14 illustrates a flowchart view of a process for joining a network or fabric using an assisting device on the fabric or network, according to an embodiment.

FIG. 14 illustrates a flowchart diagram of a process by which the device may add network or fabric credentials from a device on the network or fabric. The device 500 to be added to the network or fabric contacts the service 502 (block 602). The contact may include a communication that includes an indication to the service 502 that indicates that the device 500 has not connected to a specific network type (e.g., 802.15.4) or a fabric. For example, in certain embodiments, the device 500 may include a header that has a flag that indicates status of such connections, such as a HasFabric tag or a HasLowPAN tag in an X-nl-weave-device-descriptor. Based on the header values, the device 500 waits to receive a communication from the service 502 (block 604). The response indicates at least one assisting device that may be used to join the network 594. For example, the response may include a device ID for the assisting device that allows the identification of the assisting device as the device to assist in joining the network 594. In some embodiments, the response from the service 502 may be sent to wake the device 500 or after the service 502 has awoken the device 500 if the device 500 is a sleepy device. In some embodiments, the device 500 may be an "always on" device so that the service 502 does not awaken the device 500, or the device 500 may wake up on and connect with the service 502 on its own accord (e.g., routinely, in response to sensor actuation, etc.).

Once the device 500 receives a response from the service, the device 500 then examines the headers in the response to determine if the device ID corresponds to the device 500 (block 606). If the device ID corresponds to the device 500, the device 500 will then create a network and/or fabric as discussed below in relation to FIG. 15 (block 607). If the device ID corresponds to another device, the device 500 determines whether it is in a state to be a joining device (block 608). For example, the device 500 determines whether it has the provisioning information, whether the device 500 is a same structure as the assisting device, the device 500 is not already a member of the primary fabric for its structure, whether the device 500 is online, whether the device is not currently busy (e.g., not in the middle of a heat cycle), and/or the device 500 is running a version of software capable of joining the network and/or fabric. If the device 500 is not ready to join a fabric or network for any reason, the device 500 may report such status to the service 502 (block 610). In some embodiments, once the device 500 has reported its inability to join currently, the device 500 may return to waiting for a communication from the service 502.

It should be appreciated that signaling the device 500 to create its own network and/or fabric is not necessarily limited to setting the header to the device ID of device 500. Rather, the service 502 may instruct the device 500 to create its own network and/or fabric using any of a variety of commands or instructions sent from the service 502 or on behalf of the service 502 to the device. Moreover, such an instruction need not be sent in response to the device 500 contacting the service 502, but rather can be communicated to the device 500 at other times.

Returning to FIG. 14, if a network and/or fabric already exists and the device 500 is ready to join the network/fabric, the device 500 obtains a token from the service 502 (block 612). For example, the service 502 may include an Access Token Retrieval Service that vends access tokens to authorized devices for the purposes of in-field joining. For example, the Access Token Retrieval Service may be a Representational State Transfer (REST) web service hosted by the PoC 590. The service 502 implements a single fetch operation that returns the access token of the account with which the device 502 is paired. In some embodiments, the service 502 actively restricts vending of access tokens to devices that authenticate with assigned credentials. Specifically, assigned credentials may be credentials that are stored in a device when paired to an account that provide additional functionality over default credentials that may be stored in the device at manufacture as discussed in U.S. Pat. No. 8,635,373 entitled "Subscription-Notification Mechanisms for Synchronization of Distributed States," filed on Sep. 22, 2012, incorporated by reference in its entirety. Additionally, in some embodiments, only devices that are currently undergoing in-field joining (based on determination by PoC 590) are allowed to retrieve access tokens. Moreover, in some embodiments, when the communication from the service 502 is received in block 604, the communication may include the token.

Using the obtained token, the device 500 connects to the assisting device (block 614). For example, the device 500 may connect to the assisting device 598 via the access point 599 over a WiFi network connection. The device 500 uses the id of the assisting device (as received from the service 502) to form an IPv6 link-local address and then establishes a fabric TCP connection to the address over the WiFi interface for the device 500. Alternatively, the device 500 may attempt to connect directly to devices within range and may attempt to identify them as the assisting device using Bluetooth®, infrared, 802.15.4, and/or other wired or wireless connection techniques suitable for establishing a connection between the device 500 and the assisting device. In some embodiments, the device 500 may not know the address (e.g., IPv4 or IPv6 address) for the assisting device, and instead, the device 500 may send a multicast message asking for the proper assisting device to respond. In some embodiments when the device 500 is attempting to join network of a particular type (e.g. 802.15.4), the device 500 may use an unsecured channel of that network type to attempt to communicate with the assisting device. Moreover, in some embodiments, the device 500 stores the token in volatile memory only during the joining process and actively destroys the token after the process is completed either successfully or unsuccessfully.

In connecting to the assisting device, the device 500 establishes a secure session. For example, the device 500 may securely connect to the assisting device using an authenticated session establishment, such as a Certificate Authenticated Session Establishment (CASE) protocol as taught in U.S. patent application Ser. No. 14/508,933, titled "Authenticated Session Establishment," which was filed on Oct. 7, 2014, and which is incorporated by reference in its entirety. The device 500 uses the account access token retrieved from the service 502 to authenticate itself to the other device. Similarly, the assisting device uses its device certificate to authenticate itself to the joining device 500. Further communication between the two devices is authenticated and encrypted using the negotiated session keys.

Once the devices have established a secure session, the device 500 obtains the fabric and/or personal area network (PAN) information from the assisting device (block 616). For example, the device 500 may request a fabric ID, a fabric key, a PAN ID, and/or a PAN password from the assisting device using a fabric provisioning protocols. Once the device 500 has obtained the PAN/fabric information, the device 500 may cause a subordinate device to factory reset if it is connected to a subordinate device, such as a radiator controlling device (block 618). Furthermore, if the device 500 is a member of a fabric, the device 500 may leave the network or fabric (after resetting any present subordinate devices) a current fabric or network if the device 500 is a member of a network (block 620). By resetting the subordinate device and leaving the network/fabric, the device 500 causes the subordinate device to reset to a factory default that causes the subordinate device to reattempt to join the device 500 once the device has joined the network/fabric. In other words, the device 500 causes the subordinate device to leave the fabric/network, and then leaves the fabric/network itself. Furthermore, leaving the fabric/network means discarding old fabric and/or network information. To limit indeterminate state probabilities, the device 500 may delay leaving the fabric/network until it has successfully connected to the assisting device and retrieve configuration information from the assisting device.

Before or after leaving the network/fabric, the device 500 may request the assisting device to make the network joinable (block 622). For example, the assisting device may broadcast the presence of the network 594 and places the network 594 in a joinable state. The device 500 looks for and joins the network using the receive network information (block 624). Once the device 500 has joined the network, the device 500 may store the network information in persistent memory. In some embodiments, the device 500 may join the fabric before joining the network. In other embodiments, the device 500 may join the network before joining the fabric. After the information has been stored, the device 500 sends an update to the service indicating connection to the fabric and/or network (block 626). In some embodiments, the device 500 may also instruct the assisting device to disable the joining state for the network. Furthermore, this update may be included a change in headers in the x-nl-device-descriptor in a communication with the service 502. For example, if the device 500 has connected to a fabric, the device 500 may send a message to the service 502 with the HasFabric tagged as true. In other embodiments, the joining device may report the result to the service 502 by setting an ifj_result field. In some embodiments, this field is set to null by the service 502 at the start of in-field joining, and the transition from null to a result also serves as a signal to the service 502 that in-field joining has completed. In some embodiments, the value of the ifj_result field is an integer status code, such as those presented in Table 2 below:

TABLE 2

Example status codes

| | |
|---|---|
| 1 | In-field joining succeeded |
| 2 | Failure to locate assisting device |
| 3 | Failure to connect to assisting device |
| 4 | Failure to authenticate to assisting device |
| 5 | Error extracting configuration from assisting device |
| 6 | Failure to form 802.15.4 PAN |
| 7 | Failure to join 802.15.4 PAN |
| 8 | HVAC cycle in progress |
| 9 | Subordinate device join in progress |
| 10 | Subordinate device software update in progress |
| 11 | Subordinate device manual heat active |
| 12 | Incorrect Subordinate device software version |
| 13 | Failure to fetch access token |
| 14 | Device not Weave provisioned |
| 15 | Failed to factory reset Subordinate device |
| 16 | Failed destroy existing fabric. |
| 17 | Failed to join existing fabric |
| 18 | Failed to create new fabric |
| 19 | Failed to join with Subordinate device |
| 20 | Internal error |
| 100 | Joining operation timed out (set by service) |

In some embodiments, the update to the service 502 allows the service to identify the device 500 as a new potential assisting device in the network/fabric. It also enables the service to allow a new joining device to use the currently active assisting device while the assisting device is still awake. In some embodiments, after the device 500 has joined the fabric/network, the device 500 may request service configuration details (block 628). For example, the device 500 requests an entry URL for the PoC 590 that causes the PoC 590 to deliver service configuration details.

Creating a New Fabric

Figure 15:
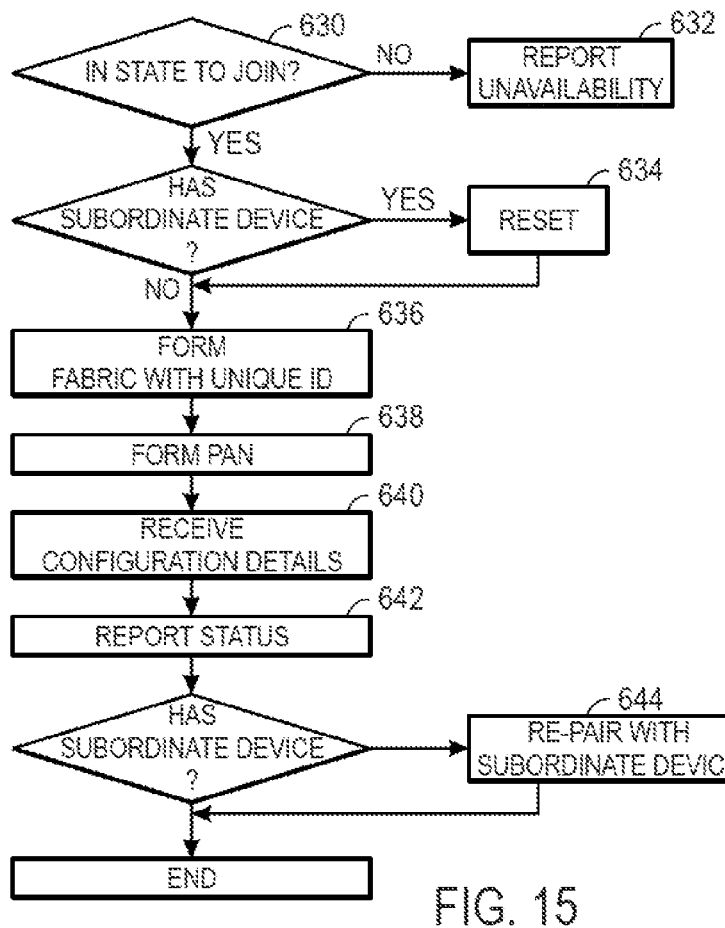
FIG. 15 illustrates a flowchart view of a process for creating a fabric, according to an embodiment.

As previously discussed, FIG. 15 illustrates a flow chart diagram for forming a new fabric. The device 500 determines whether it is in a state to create a fabric (block 630). For example, the device 500 determines whether it has provisioning information, whether the device 500 is not already a member of the primary fabric for its structure, whether the device 500 is online, whether the device is not currently busy (e.g., not in the middle of a heat cycle), and/or the device 500 is running a version of software capable of creating the fabric. If the device 500 is not ready to create a fabric, the device 500 may report the unavailability to the service 502 (block 632). If the device 500 is ready to create a fabric, the device 500 may cause a factory reset of a subordinate device, as previously discussed (block 634). The device 500 then forms a fabric by generating a fabric ID (e.g., 16 byte random number) and a fabric key using encryption quality random number generation (block 636). The device 500 then stores the fabric ID and the fabric key in memory.

The device 500 then forms a PAN with a PAN ID and PAN password (block 638). In some embodiments, if the device generates a PAN, the device may generate a PAN ID that incorporates at least a portion of the fabric ID (e.g., last 4 digits) and a random 16 byte PAN key. The device 500 then requests and receives service configuration details from the service 502 (block 640). The joining device also reports status of the fabric creation similar to the status update discussed above (block 642). Moreover, if the device 500 has a subordinate device, the device 500 may re-pair with the subordinate device on the new fabric after the subordinate device has been factory reset (block 644).

Assisting Device

Figure 16:
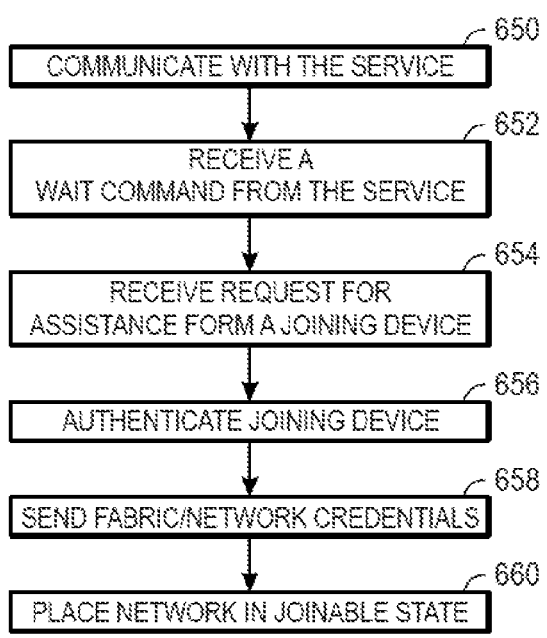
FIG. 16 illustrates a flowchart view of a process for assisting a device in joining a network or fabric, according to an embodiment.

FIG. 16 illustrates a flow diagram view of a process for assisting a device in joining a network/fabric. During a normal operation communication, the assisting device may connect to the service 502 (block 650). For example, the assisting device may connect to the service to check for updates, send an activity log, a sensor log, and/or some other transaction. In some embodiments when the assisting device is sleepy, the device may awaken prior to the communication, and the device may typically return to sleep after completing communication with the service 502. Therefore, to facilitate communication between a joining device and the assisting device while the assisting device is awake, the assisting device may receive a request from the service 502 to wait for some period (e.g., 1, 2, 3, 4, or 5 minutes) before returning to sleep (block 652). In some embodiments, receiving the wait command may include receiving an indication that the device is supposed to assist in a device joining a network/fabric upon which the device resided. Furthermore, the waiting command may be accompanied by a token generated by the service, an indication of a token to be used to authenticate the device, a name for the device, and/or another suitable mechanism for verifying authenticity of a subsequent request from a joining device. In other embodiments, the assisting device may have at least one pre-existing token known to the service 502 via the REST service that may be used to authenticate a joining device.

After the wait command, the assisting device may receive a request from a potential joining device (e.g., device 500) for the assisting device to assist a joining device in joining the network/fabric upon which the assisting device resides (block 654). Using a suitable authentication mechanism (e.g., token), the assisting device may authenticate whether the joining device has authority to receive network/fabric credentials (block 656). For example, the device may employ the authentication discussed previously in reference to FIG. 14. In some embodiments, if the device cannot be authenticated, the assisting device may close the connection with the joining device and/or send a report to the service of a failed attempt (block 658). In certain embodiments, the assisting device may then disallow authentication using the token and may request the generation of a new key by the service 502. In other embodiments, the assisting device may allow a limited number of failures per session (e.g., 3).

Once the joining device is authenticated, the assisting device may transmit fabric credentials and/or network credentials for the network and/or fabric upon which the assisting device resides (block 658). In some embodiments, once the credentials are transmitted, the assisting device may place the network (e.g., 802.15.4) in a joinable state allowing the joining state to join the network using the recently received credentials to join the network (block 660). After the joining device has received the credentials and/or joined the network/fabric, the assisting device may return to a sleep state. In some embodiments, the assisting device may implement the wait command again to accommodate any other joining device that may attempt to connect during the assisting device's wake period.

Managing a Credential Exchange

Figure 17:
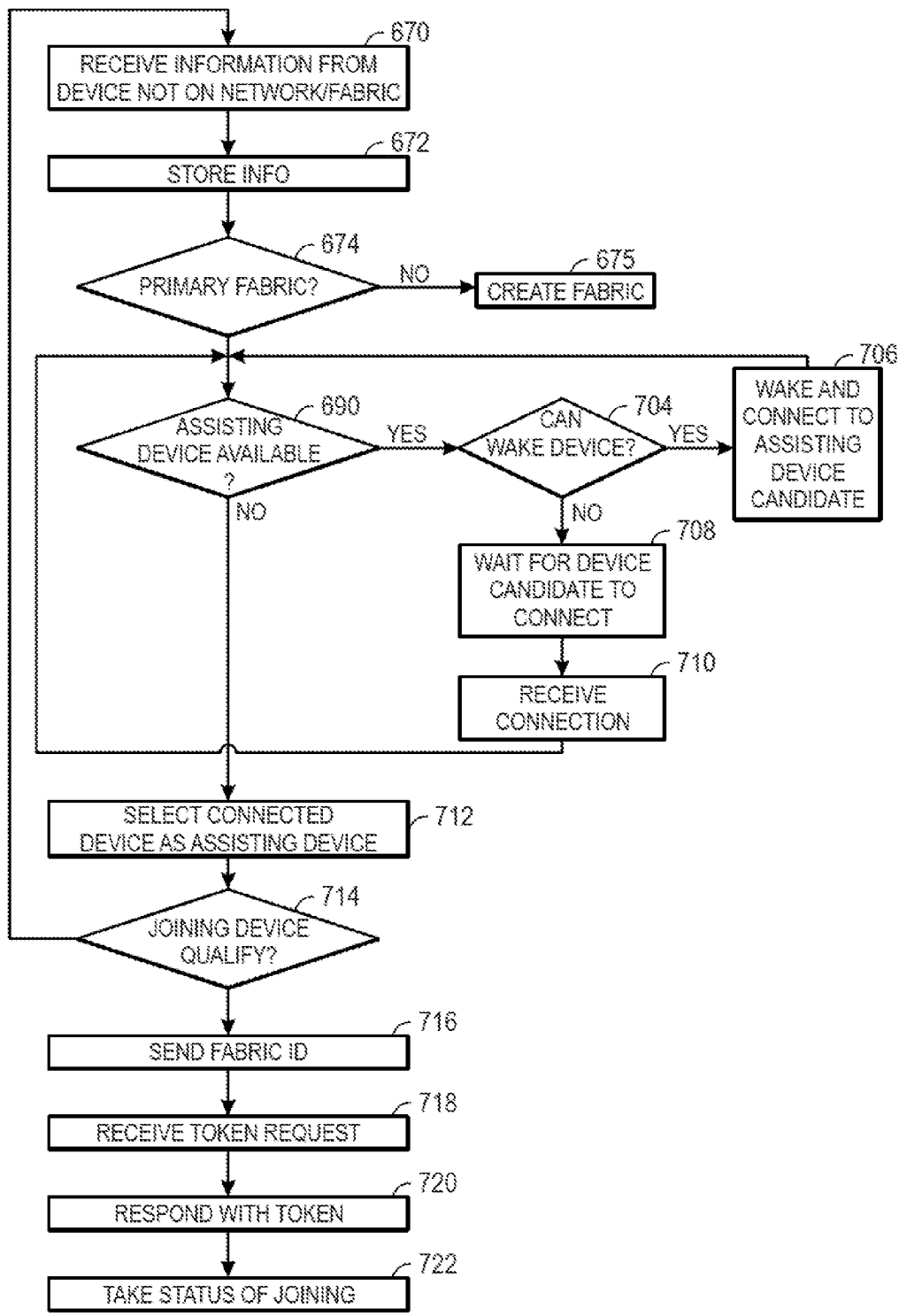
FIG. 17 illustrates a flowchart view of a process for aiding a joining device and an assisting device in facilitate a joining of a network or fabric upon which the assisting device resides, according to an embodiment.

FIG. 17 illustrates a flowchart view of a process for managing a credential exchange. A device (e.g., PoC 590) in the service 502 receives an indication that a device is not joined to a network type and/or fabric (block 670). For example, as previously discussed, the service 502 may receive a message that has headers that indicate a lack of network type and/or fabric. The service 502 may store this information (block 672) for subsequent use in determining whether a particular device is or is not joined to a network type and/or fabric. For example, where the service 502 receives such information for a number of devices, the service 502 may form a list of unconnected devices that need to be connected.

Figure 18:
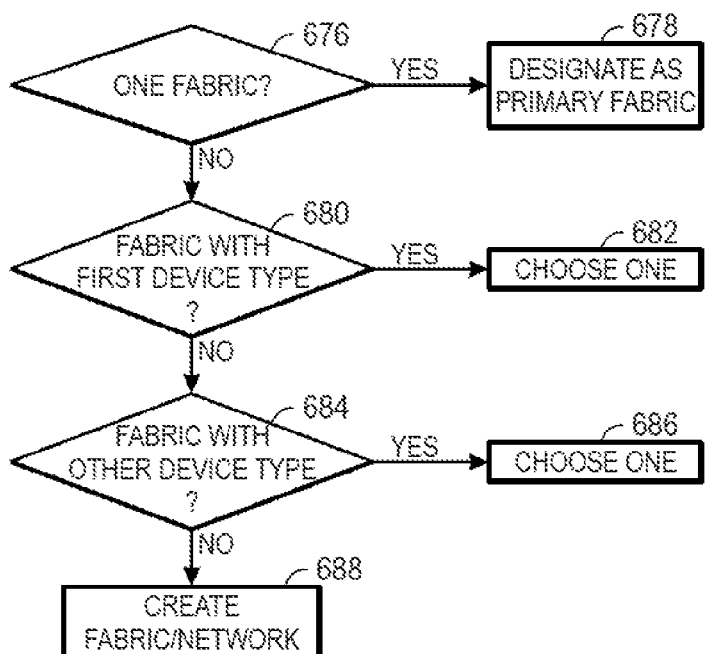
FIG. 18 illustrates a flowchart view of a process for determining a primary fabric, according to an embodiment.

In some embodiments, in response to receiving the indication from the device, the service 502 may continue processing to facilitate provisioning that device with network/fabric credentials. In other embodiments, after receiving the indication from the device, the service 502 may wait until a device suitable to be an assisting device (or a potential assisting device) contacts the service before facilitating provisioning of the device, in which case the service 502 may wake the device in response to being contacted by the assisting device (or the potential assisting device). In either case, once the service 502 has determined that it is a suitable time to begin provisioning one or more devices with network/fabric credentials, for a particular one of the devices processing may continue with block 674. That is, the service 502 may then determine whether a structure (e.g., home) has a primary fabric (block 674). If there is no primary fabric, the service 502 instructs the device 500 to create a fabric (block 675). When determining whether a device can serve as an assisting device, it is desirable to determine whether the device is a member of the structure's primary fabric. The primary Weave fabric is the fabric to which all devices will belong once the in-field joining process is complete. FIG. 18 illustrates a process for determining which fabric is the primary fabric for the structure. The service determines whether the structure has only a single fabric (block 676). If the structure has only a single fabric, the fabric may be designated as the primary fabric for the network (block 678). If there is more than a single fabric, the service determines whether there is a fabric corresponding to any device of a subset of first device type(s) within the structure (block 680). For example, the service may determine that the structure contains a fabric of a hazard detector. Furthermore, the service may determine that devices having fabrics already enabled may be considered as being part of the first device type(s). If a fabric corresponds to one of these devices, the service may select the fabric corresponding to these devices as the fabric to which all devices will join (block 682). If there is more than one fabric corresponding to the device types, the service may randomly choose one of the fabrics as the primary fabric.

If no fabrics contain any devices of the first device type, the service 502 determines whether the structure contains any fabrics corresponding to other device types, such as thermostats (block 684). For example, these devices may be a second tier priority to maintain fabric establishment. If more than one fabric exists that correspond to the second tier priority devices, the service may select the fabric having the most number of these devices connected (block 686). If no fabric has more devices than another fabric, the service 502 may randomly select one of these fabrics.

If no fabrics contain any devices at all, the service 502 determines that a new fabric should be created (block 688). As previously discussed, the service 502 sends a create fabric message to the joining device 500 to cause the joining device 500 to create the fabric.

Figure 19:
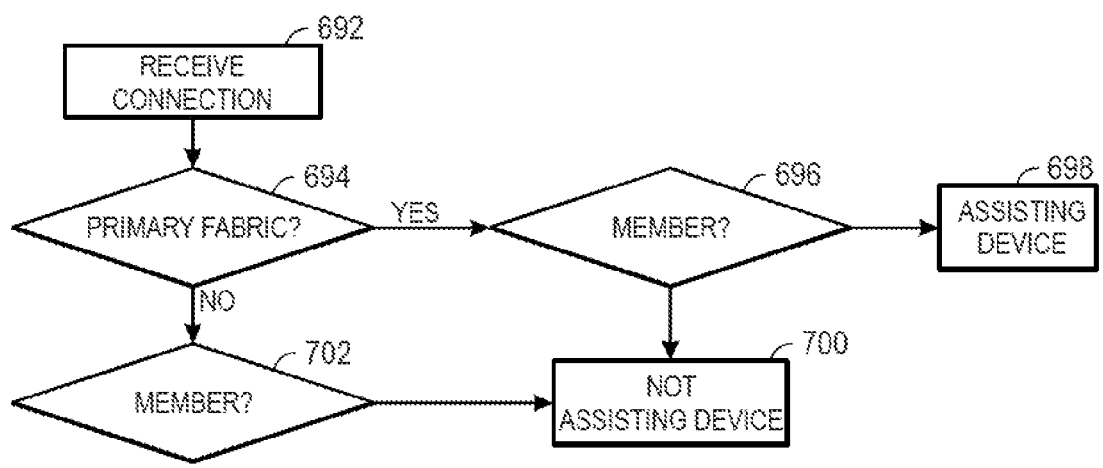
FIG. 19 illustrates a flowchart view of a process for determining whether a device qualifies as an assisting device, according to an embodiment.

Returning to FIG. 17, once a primary fabric has been selected, the service 502 determines whether a potential assisting device is available (block 690). For example, the service 502 may determine if there are any assisting devices that are currently communicating with the service 502. The service 502 may verify that any connected devices are qualified to act as assisting devices. For example, the service 502 may employ a process, such as the one illustrated in FIG. 18 to verify that one or more device types capable of assisting in the joining process are located on the fabric. As illustrated in FIG. 19, the service 502 may receive a connection from a potential assisting device (block 692). If the structure containing the joining device 500 has a primary fabric (block 694), the service 502 determines whether the assisting device candidate is a member of the primary fabric (block 696). If the assisting device candidate is a member of the primary fabric, the service 502 may deem that the device is a suitable assisting device for the particular joining device (block 698). If the assisting device is not a member of a present primary fabric, the service 502 may deem that the device is not a suitable assisting device for the particular joining device (block 700). If the structure does not include a primary fabric, the service 502 may determine whether the assisting device is a member of any fabric within the structure (block 702). If the device is a member of some fabric, the service may deem that the device is a suitable assisting device for the particular joining device, and if the device is not a member of some fabric, the service may deem that the device is not a suitable assisting device for the particular joining device.

Returning to FIG. 17, if the assisting device candidate is not deemed a suitable candidate, the service 502 may determine whether any another assisting device candidates may be awoken by the service 502, such as remotely awakening a thermostat using the control 592 (block 704). In some embodiments, the service 502 may also instruct a user to manually awaken a device by pressing a button on the device. If the service 502 may awaken an assisting device candidate, the service 502 may awaken and connect to the assisting device candidate (block 706). In some embodiments, the service 502 may determine whether the candidate is suitable for assisting in the joining process after awakening the device, as discussed previously in reference to FIG. 19. In other embodiments, the service 502 may determine whether the candidate is suitable for assisting in the joining process before awakening the device.

If the service determines that no assisting device candidates may be awoken, the service may wait for a connection from an assisting device candidate (block 708). Sometime after waiting, the service 502 may receive a communication from an assisting device candidate (block 710). After receiving the connection, the service may deploy the assisting device qualifications discussed in relation to FIG. 19 previously. It is worth noting that these communications may vary based on a device type of the assisting device candidate. For example, for thermostats, the selection logic may be invoked during execution of request for PoC 590 URL, but for hazard detection devices, selection may occur during a service directory request.

Once a device has been qualified as an assisting device, the service 502 selects the qualified device as the assisting device (block 712). In some embodiments, the service 502 may then determine whether any devices qualify as joining devices (block 714). For example, the service 502 may determine whether it has previously received an indication that one or more devices are not a member of a fabric/network. The service 502 may also determine whether other qualifications are present. For example, the service 502 may determine whether the joining device is an expected device type (e.g., thermostat), whether the device is running a version of software that supports in-field joining, whether the device is in the same structure as the assisting device, whether the device has already been provisioned with fabric credentials, whether the device is not already be a member of the structure's primary fabric (although it can be a member of a different fabric), whether the device is online at the time device selection occurs, whether the device is not busy (e.g., in middle of a heat cycle), and/or other factors relevant to whether the device can currently join a network or fabric.

The service 502 then sends a device ID of the assisting device to the joining device 500 (block 716). As discussed previously, the service 502 may receive a request for a token from the joining device 500 for the assisting device (block 718) to which the service may respond with a token using a REST service (block 720). In some embodiments, the service 502 may also instruct the assisting device to wait for a request for assistance, as previously discussed. Furthermore, the service 502 may track a status of the joining process throughout the joining process (block 722). For example the service 502 tracks the status of the in-field joining process in a centralized data store and uses this information to coordinate in-field joining, both service-wide, and on a structure-by-structure basis. For example, the service 502 may track a list of currently active in-field joining attempts, including the ids of their participants (the joining and assisting devices) and the structure to which they belong and the start time; the fabric/network membership state for all devices; and/or the time and result of the last failed in-field joining attempt for each Diamond. Furthermore, in some embodiments, at the structure level, the service 502 coordinates the in-field joining process to ensure that only a single joining attempt is in progress within a structure at any given point in time. This includes ensuring that new fabric creation occurs at most once in any structure. This behavior avoids race conditions that arise when multiple devices connect to PoC 590 at the same time. It also reduces the number of states that the joining process can be in, significantly simplifying the testing process.

Assisting Device Hierarchy

Figure 20:
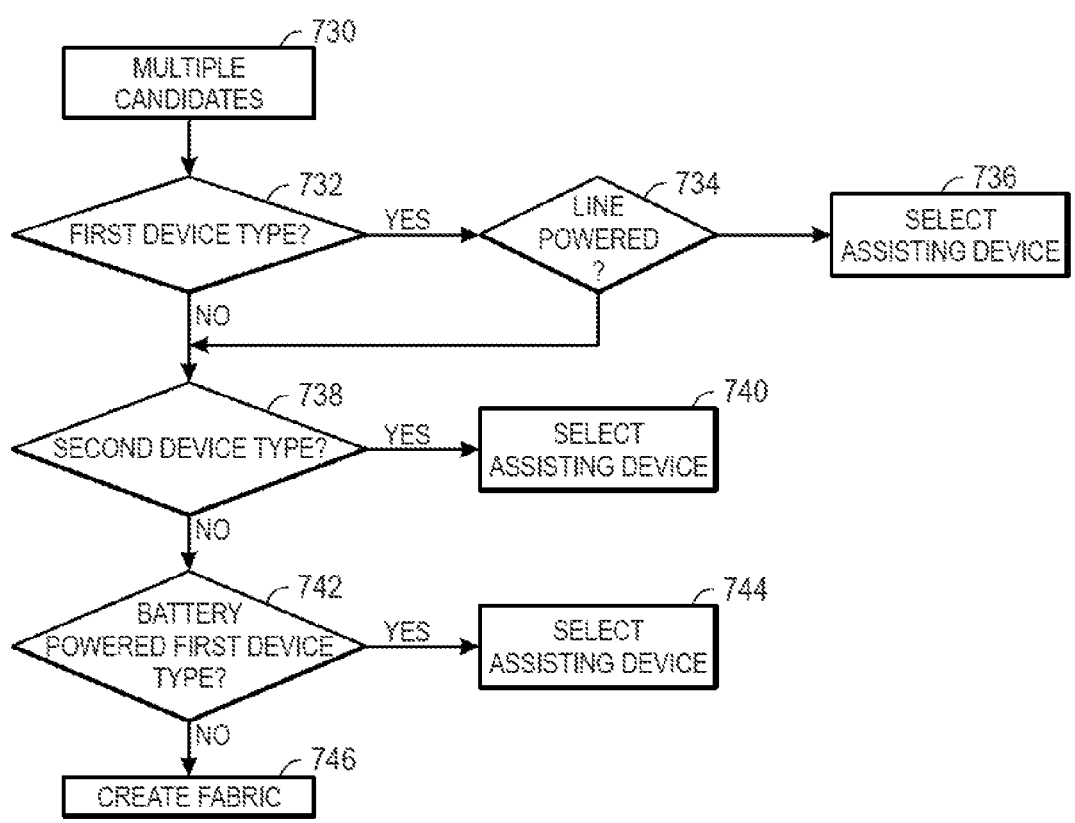
FIG. 20 illustrates a flowchart view of a process for selecting an assisting device, according to an embodiment.

As previously discussed, the service 502 may awaken assisting devices as part of the joining process. In such embodiments, the service 502 may prioritize which devices to use as assisting devices. FIG. 20 illustrates a flowchart diagram that may be used to select an assisting device from multiple candidates. The service 502 may determine that more than one assisting device candidates are present in the fabric (block 730). The service 502 then determines whether the multiple assisting device candidates include one or more devices of a first device type (block 732). For example, the service 502 may determine whether the candidates include a hazard detector. The service 502 may then determine whether any of the devices of the first type are line powered (block 734). If any of the devices are line powered, the service may select one of the line powered devices of the first device type as the assisting device (block 736). If no devices of the first type are line powered or there are no devices of the first type, the service 502 determines whether any devices of the second type are present (block 738). If any of the devices are of the second type, the service 502 may select one of the devices of the second type as the assisting device (block 740). If no devices of the second type are present, the service may determine whether there are any battery powered devices of the first type (block 742). If any battery powered devices of the first type are present, the service 502 may select one of the battery powered devices of the first type as an assisting device (block 744). If no battery powered devices of the second type are present, the service 502 may instruct the joining device 500 to create a new fabric in accordance with the foregoing discussion.

Changing the Pairing Process

In some embodiments, devices may establish their relationships with a user account using a pre-existing pairing process that pre-dates the fabric/network joining discussed herein. For example, the pre-existing pairing process may include the pairing process discussed in U.S. patent application Ser. No. 13/275,311, entitled "Methods, Systems, and Related Architectures for Managing Network Connected Thermostats," filed on Oct. 17, 2011, and published as U.S. Publication No. 2012/0239221, which incorporated herein in its entirety. Specifically, the pre-existing pairing process may include an auto-pairing mode that uses a common source address detection technique to automatically discover unpaired devices and prompt the user to pair them to their account. The auto-pairing feature involves a single-click confirmation step on the device which is designed to ensure the device is paired with the correct account.

After provisioning and joining, these devices may connect to additional devices. Thus, the pairing process may be changed to increase security of the network, fabric, and/or account. Accordingly, in some embodiments, auto-pairing in the service 502 may be changed such that auto-pairing only occurs when a device being added is the first device on the account. Note, that under the new auto-pairing, the device may be auto-paired only if it is the first device of any type on the account, not just the first of a single device type. Once the first device has been added to an account, all subsequent device pairings may be blocked from auto-pairing and forced to manually pair.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. An electronic device comprising:
   a processor;
   a network interface; and
   a memory configured to store instructions configured to cause the processor to:
      send a message indicating a lack of provisioning information to a service by sending the message via the network interface, the message comprising headers that include:
         a device identifier header comprising a device identifier for the electronic device; and
         a provisioning state field comprising a state indicating a provisioned state, a not-provisioned state, or a last provisioning failed state;
      receive the provisioning information from the service, based on the indicated state being the not-provisioned state or the last provisioning failed state;
      verify the provisioning information;
      if the provisioning information is valid, store the provisioning information in the memory; and
      use the provisioning information to connect to an existing network or create a new network.

2. The electronic device of claim 1, wherein the instructions are configured to cause the processor to:
   determine whether the memory contains a fabric certificate for the electronic device;
   determine whether the memory contains a private key matching the fabric certificate; and
   determine whether the memory contains a pairing code for the electronic device.

3. The electronic device of claim 2, wherein the instructions are configured to cause the processor to send the message if the processor determines that the memory does not contain the fabric certificate, the private key, and the pairing code.

4. The electronic device of claim 1, wherein the instructions are configured to cause the processor to decrypt the provisioning information using a secret stored in the memory of the electronic device that is unknown by the service.

5. The electronic device of claim 1, wherein the instructions are configured to cause the processor to verify the provisioning information comprising to:
   decode a fabric certificate;
   verify that the device identifier of the electronic device matches an identifier in the fabric certificate;
   verify that a private key in the provisioning information matches a public key of the fabric certificate; and
   verify that a pairing code includes a valid check digit.

6. The electronic device of claim 5, wherein the electronic device comprises a housing upon which the pairing code is visible.

7. The electronic device of claim 1, wherein the provisioning information comprises:
   a fabric certificate for the electronic device;
   a private key for a fabric certificate; and
   a pairing code for the electronic device.

8. The electronic device of claim 1, wherein the instructions are configured to cause the processor to update a provisioning status for the electronic device if the provisioning information has been verified.

9. A non-transitory, computer-readable medium having instructions stored thereon, wherein the instructions, when executed, are configured to cause a processor to:
  receive a message with an indication of a provisioning status for a remote device, the message comprising headers that include:
    a device identifier header comprising a device identifier for the remote device; and
    a provisioning state field comprising a state indicating a provisioned state, a not-provisioned state, or a last provisioning failed state; and
  if the provisioning status indicates that the remote device has not been provisioned:
    request a provisioning bundle from a provisioning database for the remote device; and
    receive and forward the provisioning bundle from the provisioning database to the remote device, the provisioning bundle causing the remote device to connect to an existing network or create a new network.

10. The non-transitory, computer-readable medium of claim 9, wherein the request for the provisioning bundle comprising to:
  derive the device identifier from the message; and
  send the device identifier to the provisioning database as an identifier for a respective provisioning bundle of a plurality of provisioning bundles stored in the provisioning database.

11. The non-transitory, computer-readable medium of claim 9, wherein the provisioning bundle comprises:
  a fabric certificate for the remote device;
  a private key for the fabric certificate; and
  a pairing code for the remote device.

12. The non-transitory, computer-readable medium of claim 9, wherein the instructions are configured to cause the processor to log an error if the provisioning state field indicates the last provisioning failed state.

13. The non-transitory, computer-readable medium of claim 9, wherein the instructions are configured to cause the processor to take no action if the provisioning state field indicates the provisioned state or the message lacks the indication of the provisioning status.

14. The non-transitory, computer-readable medium of claim 11, wherein if the message lacks the indication of the provisioning status, the instructions are configured to cause the processor to determine that the remote device is not currently compatible with provisioning.

* * * * *

UNITED STATES PATENT AND TRADEMARK OFFICE
CERTIFICATE OF CORRECTION

PATENT NO. : 9,760,501 B2  
APPLICATION NO. : 14/533885  
DATED : September 12, 2017  
INVENTOR(S) : Jay D. Logue Page 1 of 1

It is certified that error appears in the above-identified patent and that said Letters Patent is hereby corrected as shown below:

In the Claims

Column 42, Line 21, after "claim" before "wherein" delete "11," insert --13,--

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*